(12) United States Patent
Takanohashi et al.

(10) Patent No.: US 12,190,731 B2
(45) Date of Patent: Jan. 7, 2025

(54) PLAN PROPOSAL DEVICE, SYSTEM, VEHICLE, AND PLAN PROPOSAL METHOD

(71) Applicant: TOYOTA JIDOSHA KABUSHIKI KAISHA, Toyota (JP)

(72) Inventors: Kodai Takanohashi, Okazaki (JP); Atsushi Okubo, Nisshin (JP); Yuji Tachibana, Nisshin (JP); Shogo Momoshima, Nagoya (JP); Takaaki Kato, Saitama (JP); Daiki Kaneichi, Tokyo (JP); Minoru Nakadori, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 406 days.

(21) Appl. No.: 17/651,870

(22) Filed: Feb. 21, 2022

(65) Prior Publication Data
US 2022/0319321 A1    Oct. 6, 2022

(30) Foreign Application Priority Data
Mar. 31, 2021 (JP) ................. 2021-061873

(51) Int. Cl.
*G08G 1/14*    (2006.01)
*G06N 3/08*    (2023.01)
*G06Q 10/02*    (2012.01)

(52) U.S. Cl.
CPC .............. *G08G 1/148* (2013.01); *G06N 3/08* (2013.01); *G06Q 10/02* (2013.01); *G08G 1/141* (2013.01); *G08G 1/146* (2013.01)

(58) Field of Classification Search
CPC ........ G08G 1/148; G08G 1/141; G08G 1/146; G08G 1/143; G08G 1/144; G08G 1/0125; G08G 1/0969; G08G 1/14; G06N 3/08; G06N 20/00; G06Q 10/02; G06Q 10/04; G06Q 10/0637; G06Q 10/067
See application file for complete search history.

(56) References Cited

U.S. PATENT DOCUMENTS

| | | | |
|---|---|---|---|
| 2005/0021227 A1* | 1/2005 | Matsumoto | ........ G01C 21/3415 701/431 |
| 2012/0326893 A1* | 12/2012 | Glezerman | ............ G08G 1/148 340/932.2 |
| 2014/0122190 A1* | 5/2014 | Wolfson | ................. G08G 1/141 705/13 |
| 2014/0266805 A1* | 9/2014 | Tippelhofer | ........... G08G 1/148 340/932.2 |
| 2017/0316690 A1* | 11/2017 | Charles | ................. H04W 4/023 |

(Continued)

FOREIGN PATENT DOCUMENTS

| | | |
|---|---|---|
| DE | 102017011023 A1 | 5/2018 |
| JP | 2005-004431 A | 1/2005 |

(Continued)

*Primary Examiner* — Ryan W Sherwin
(74) *Attorney, Agent, or Firm* — SoraIP, Inc.

(57) ABSTRACT

A plan proposal device includes a controller configured to predict, as a user action, an action of a first user in a certain period, including parking a vehicle in a parking lot shared by a plurality of users including the first user, generate proposal data for proposing an action plan in the certain period based on an obtained prediction result and information on the parking lot in the certain period, and output the generated proposal data.

19 Claims, 14 Drawing Sheets

(56) References Cited

U.S. PATENT DOCUMENTS

| | | | |
|---|---|---|---|
| 2017/0372608 A1 | 12/2017 | Sugimoto et al. | |
| 2018/0143029 A1* | 5/2018 | Nikulin | G01C 21/3415 |
| 2018/0150773 A1 | 5/2018 | Lee | |
| 2020/0086853 A1* | 3/2020 | Kumar | G06Q 50/188 |
| 2020/0311849 A1* | 10/2020 | Noguchi | G06Q 10/02 |
| 2021/0004705 A1 | 1/2021 | Kim | |
| 2021/0217310 A1* | 7/2021 | Ikoma | G08G 1/146 |

FOREIGN PATENT DOCUMENTS

| | | | |
|---|---|---|---|
| JP | 2005-114424 A | 4/2005 | |
| JP | 2005-284699 A | 10/2005 | |
| JP | 2016-006605 A | 1/2016 | |
| JP | 2019061651 A | 4/2019 | |
| JP | 2020-046982 A | 3/2020 | |
| JP | 2020166631 A | 10/2020 | |
| KR | 10-1306891 B1 | 9/2013 | |
| KR | 10-1421599 B1 | 7/2014 | |
| KR | 10-2017-0095326 A | 8/2017 | |
| KR | 10-2018-0134636 A | 12/2018 | |
| KR | 10-2019-0080327 A | 7/2019 | |
| KR | 10-2019-0090738 A | 8/2019 | |
| KR | 10-2020-0074758 A | 6/2020 | |

* cited by examiner

PLAN PROPOSAL DEVICE, SYSTEM, VEHICLE, AND PLAN PROPOSAL METHOD

CROSS-REFERENCE TO RELATED APPLICATION

This application claims priority to Japanese Patent Application No. 2021-061873 filed on Mar. 31, 2021, incorporated herein by reference in its entirety.

BACKGROUND

1. Technical Field

The present disclosure relates to a plan proposal device, a system, a vehicle, and a plan proposal method.

2. Description of Related Art

Japanese Unexamined Patent Application Publication No. 2019-061651 (JP 2019-061651 A) discloses a device for predicting whether a parking lot will be full, empty, or congested in the future by focusing on individual time-series action patterns of a plurality of users.

SUMMARY

User's dissatisfaction can hardly be resolved simply by notifying the user that the parking lot is congested.

The technology of the present disclosure improves user's satisfaction.

A plan proposal device according to the present disclosure includes a controller configured to predict, as a user action, an action of a first user in a certain period, including parking a vehicle in a parking lot shared by a plurality of users including the first user and a second user, generate proposal data for proposing an action plan in the certain period based on an obtained prediction result and information on the parking lot in the certain period, and output the generated proposal data.

A plan proposal method according to the present disclosure includes: predicting, by a controller, as a user action, an action of a first user in a certain period, including parking a vehicle in a parking lot shared by a plurality of users including the first user; generating, by the controller, proposal data for proposing an action plan in the certain period based on an obtained prediction result and information on the parking lot in the certain period; and outputting the generated proposal data from the controller.

According to the present disclosure, user's satisfaction is improved.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Several embodiments of the present disclosure will be described below with reference to the drawings.

In each drawing, the same or corresponding portions are denoted by the same reference signs. In the description of each embodiment, description of the same or corresponding portions will be omitted or simplified as appropriate.

An embodiment of the present disclosure will be described.

Figure 1:
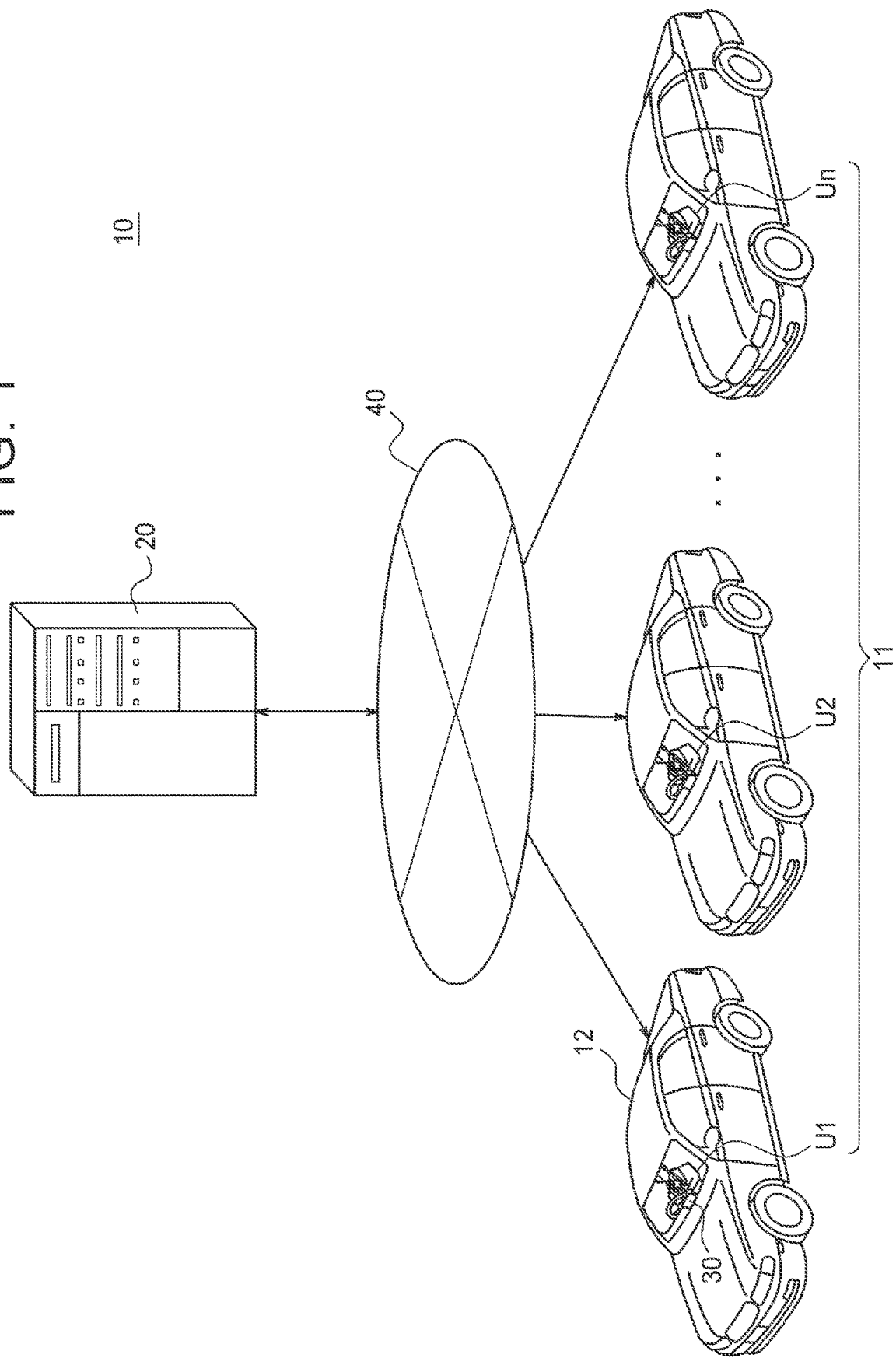
FIG. 1 is a diagram illustrating a configuration of a system according to an embodiment of the present disclosure.

The configuration of a system 10 according to the present embodiment will be described with reference to FIG. 1.

The system 10 according to the present embodiment includes at least one plan proposal device 20 and at least one terminal device 30. The plan proposal device 20 can communicate with the terminal device 30 via a network 40. The plan proposal device 20 may communicate with one or more other terminal devices via the network 40.

The plan proposal device 20 is installed in a facility such as a data center. The plan proposal device 20 is a computer such as a server belonging to a cloud computing system or other computing systems.

The terminal device 30 is mounted on a vehicle 12 and is used by a user U1 who drives the vehicle 12. The terminal device 30 is an in-vehicle device such as a car navigation device. Alternatively, the terminal device 30 may be connected to the vehicle 12 as an external device or held by the user U1. The terminal device 30 may be a mobile device such as a mobile phone, a smartphone, or a tablet.

When the plan proposal device 20 is communicable with one or more other terminal devices, the terminal devices are mounted on vehicles and used by users U2, . . . , Un who drive the vehicles, respectively. Each of those terminal devices is an in-vehicle device such as a car navigation device. Alternatively, the terminal devices may be connected to the vehicles as external devices or held by the users U2, ..., Un, respectively. Each of the terminal devices may be a mobile device such as a mobile phone, a smartphone, or a tablet. The number n of users 11 is any integer of 2 or more.

The vehicle 12 is any type of vehicle such as a gasoline vehicle, a diesel vehicle, an HV, a PHV, an EV, or an FCV. The term "HV" is an abbreviation for "hybrid vehicle". The term "PHV" is an abbreviation for "plug-in hybrid vehicle". The term "EV" is an abbreviation for "electric vehicle". The term "FCV" is an abbreviation for "fuel cell vehicle". The vehicle 12 is driven by a driver in the present embodiment, but the driving may be automated at any level. For example, the automation level is any one of Level 1 to Level 5 defined by SAE. The term "SAE" is an abbreviation for "Society of Automotive Engineers". The vehicle 12 may be a MaaS vehicle. The term "MaaS" is an abbreviation for "Mobility as a Service".

The network 40 includes the Internet, at least one WAN, at least one MAN, or any combination thereof. The term "WAN" is an abbreviation for "wide area network". The term "MAN" is an abbreviation for "metropolitan area network". The network 40 may include at least one wireless network, at least one optical network, or any combination thereof. Examples of the wireless network include an ad hoc network, a cellular network, a wireless LAN, a satellite communication network, or a terrestrial microwave network. The term "LAN" is an abbreviation for "local area network".

Figure 2:
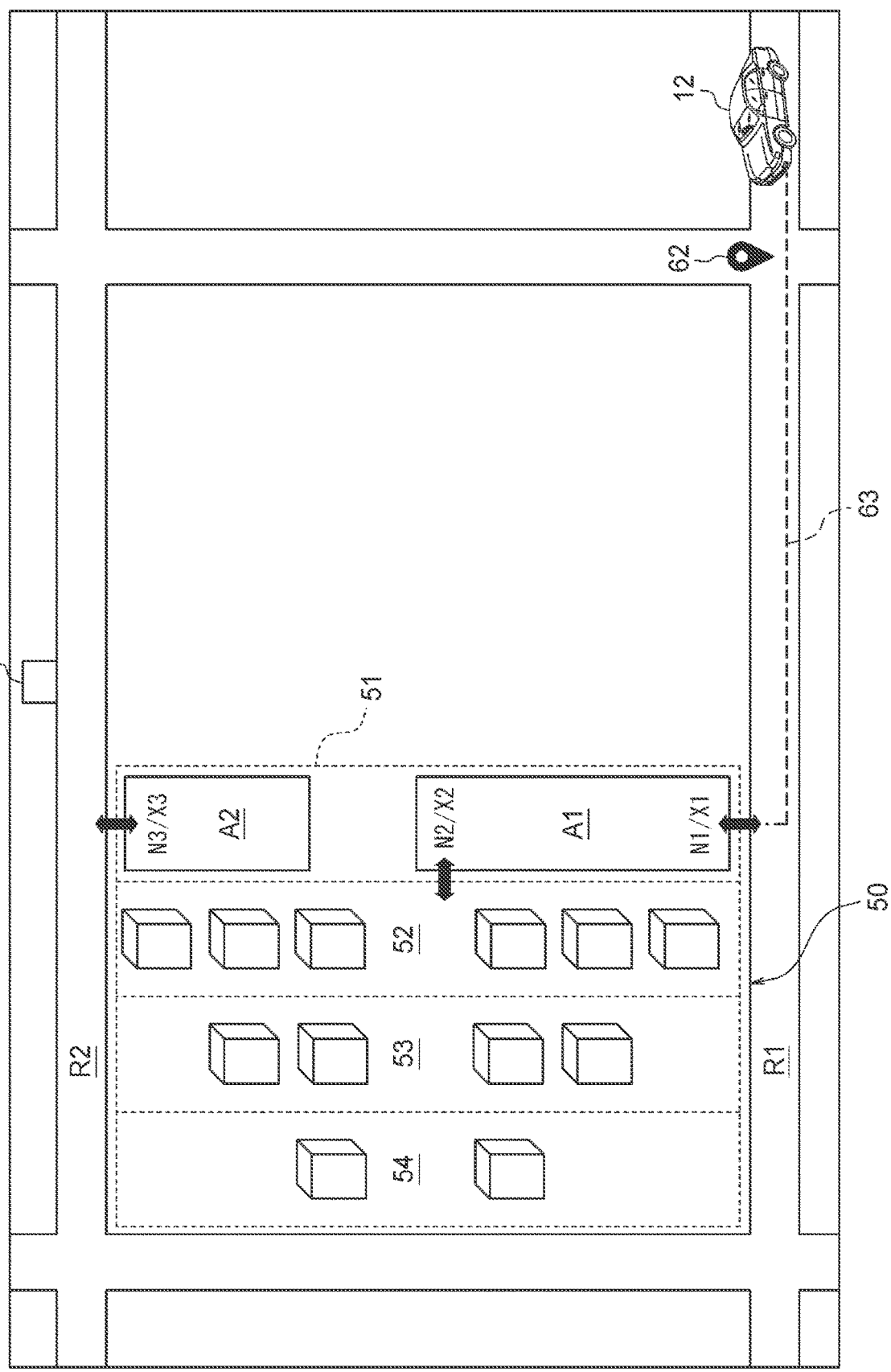
FIG. 2 is a diagram illustrating an example of a parking lot.
Figure 3:
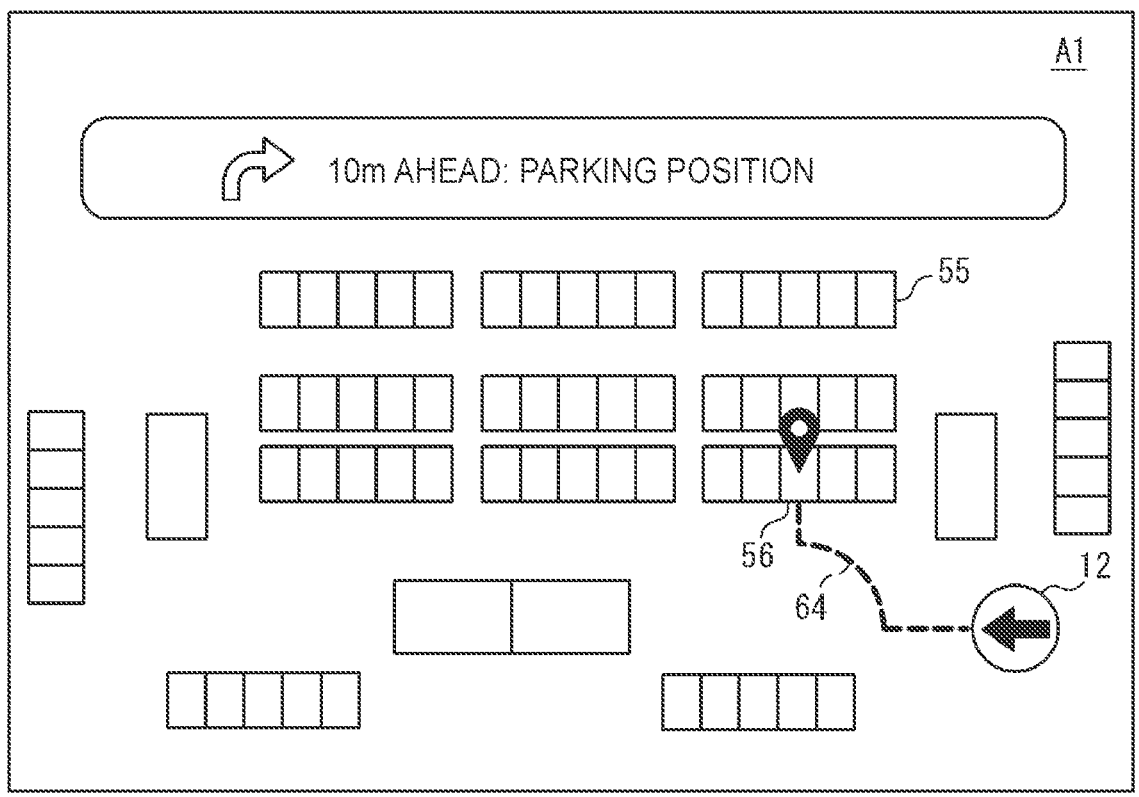
FIG. 3 is a diagram illustrating an example of a plurality of parking spaces.

The outline of the present embodiment will be described with reference to FIGS. 1, 2, and 3.

The plan proposal device 20 predicts an action of the user U1 in a period P as a user action. The user action includes parking the vehicle 12 in a parking lot 51 shared by a plurality of users 11. The plan proposal device 20 generates proposal data D1 based on the obtained prediction result and information on the parking lot 51 in the period P. The proposal data D1 is data for proposing an action plan in the period P. The plan proposal device 20 outputs the generated proposal data D1. In the present embodiment, the plan proposal device 20 outputs the proposal data D1 to the network 40. That is, the plan proposal device 20 transmits the proposal data D1 to the terminal device 30.

The terminal device 30 receives the proposal data D1 from the plan proposal device 20. The terminal device 30 presents the received proposal data D1 to the user U1.

According to the present embodiment, it is possible to propose the action plan to the user U1 depending on a situation of the parking lot 51, instead of simply notifying the user U1 about the situation of the parking lot 51. As a result, satisfaction of the user U1 is improved.

The period P may be any period in the future. In the present embodiment, the period P is a current day when the current time is in the morning, and a next day when the current time is in the afternoon. The length of the period P is one day or less in this embodiment, but may be longer than one day, as typified by several days, one week, or several weeks.

The parking lot 51 may be provided at any location. In the example of FIG. 2, the parking lot 51 is provided on the ground in a town 50. Each user 11 is a resident, a worker, or a visitor in the town 50.

The parking lot 51 may be divided into a plurality of parking areas. In the example of FIG. 2, the parking lot 51 is divided into a parking area A1 along a road R1 and a parking area A2 along a road R2. The parking area A1 and the parking area A2 include a ground parking lot, an underground parking lot, a multi-story parking lot, or any combination thereof.

The town 50 includes a first building group 52 located across a street from the parking area A1, a second building group 53 located away from the parking area A1, and a third building group 54 located farther away from the parking area A1 than the second building group 53. Various last-mile mobility services can be used to move from the parking area A1 to these building groups. The last-mile mobility includes AGVs or delivery robots for carrying luggage, mobility for walking areas, such as electric kickboards or electric scooters, shared vehicles for ride sharing or car sharing, crosstown buses or on-demand buses that can be boarded at bus stops, or any combination thereof. The term "AGV" is an abbreviation for "automated guided vehicle". The shared vehicles are parked in dedicated parking spaces in the parking area A1. The bus stops are provided in or near the parking area A1.

For example, it is assumed that the user U1 is a resident in a house included in the first building group 52 and goes shopping outside the town 50 by the vehicle 12. It is assumed that the user U1 parks the vehicle 12 in the parking area A1 when returning home. In this case, the user U1 may move from the parking area A1 to the house on foot or by mobility for walking areas. The user U1 may transport purchased items from the parking area A1 to the house by an AGV or a delivery robot.

Alternatively, it is assumed that the user U1 is a worker in an office included in the second building group 53 and commutes by the vehicle 12 from his/her house outside the town 50. It is assumed that the user U1 parks the vehicle 12 in the parking area A1 when commuting. In this case, the user U1 may move from the parking area A1 to the office on foot, by mobility for walking areas, or by a crosstown bus or an on-demand bus.

Alternatively, it is assumed that the user U1 is a visitor from outside the town 50 and comes by the vehicle 12 to meet a friend living in a house included in the third building group 54. It is assumed that the user U1 parks the vehicle 12 in the parking area A1 when visiting the friend. In this case, the user U1 may move from the parking area A1 to the house by a shared vehicle or by a crosstown bus or an on-demand bus.

The parking lot 51 has one or more entrances. In the example of FIG. 2, the parking lot 51 has three entrances N1, N2, and N3. The parking lot 51 has one or more exits. In the example of FIG. 2, the parking lot 51 has three exits X1, X2, and X3.

The entrance N1 and the exit X1 face the road R1. The entrance N1 is used by vehicles entering the parking area A1 from the road R1, in particular, an intersection 62 on the road R1. The exit X1 is used by vehicles exiting the parking area A1 into the road R1.

The entrance N2 and the exit X2 face a street in the town 50. The entrance N2 is used by vehicles entering the parking area A1 from the street. The exit X2 is used by vehicles entering the street from the parking area A1.

The entrance N3 and the exit X3 face the road R2. The entrance N3 is used by vehicles entering the parking area A2 from the road R2. The entrance N3 is closer to a convenience store 61 along the road R2 than any other entrances of the parking lot 51. Therefore, the entrance N3 is convenient for vehicles entering the parking lot 51 after a stop at the convenience store 61. The exit X3 is used by vehicles exiting the parking area A2 into the road R2. The exit X3 is closer to the convenience store 61 than any other exits of the parking lot 51. Therefore, the exit X3 is convenient for vehicles that make a stop at the convenience store 61 after exiting the parking lot 51.

In the present embodiment, the plan proposal device 20 provides route guidance to minimize a period to parking. For example, it is assumed that the user U1 sets the town 50 as a destination in the car navigation device serving as the terminal device 30 or in an application of the smartphone serving as the terminal device 30. When the vehicle 12 approaches within 1 km from the intersection 62, AI determines a route 63 that takes the shortest period to parking based on data indicating a congestion status in each gate of the town 50 or each parking area. The term "AI" is an abbreviation for "artificial intelligence". In the example of FIG. 2, determination is made that the period to parking is shortest when the vehicle 12 enters the parking area A1 from the entrance N1 along the route 63. The route 63 is displayed on the car navigation device or the application of the smartphone. When the user U1 does not set a destination, a pop-up inquiry about the necessity of guidance is displayed on the car navigation device or the application of the smartphone. When the user U1 agrees, the same route guidance as that described above is provided.

The plan proposal device 20 may provide route guidance that can be viewed at any time. For example, when the route 63 is always displayed on the car navigation device or the application of the smartphone, the user U1 can view the route guidance at any time.

Basic information on the parking lot 51 may be viewed on the terminal device 30. For example, the user U1 can surely access a desired place in the parking lot 51 when basic information such as a location of the parking lot 51, an access method, ancillary equipment, capacity, or charge can be viewed on the smartphone application or the web.

In the present embodiment, the plan proposal device 20 further provides parking space guidance to maximize user's satisfaction. For example, when the vehicle 12 enters the ground in the town 50 from the intersection 62, the AI determines a parking space 56 where the satisfaction of the user U1 is highest among available parking spaces 55 in the parking lot 51 based on a past parking tendency. A route 64 to the parking space 56 is displayed on the car navigation device or the application of the smartphone. In the example of FIG. 3, a distance and directions to the parking space 56 are displayed together with the route 64 on a map of the parking area A1.

The plan proposal device 20 may temporarily reserve the parking space 56. For example, no other vehicle can be parked in the parking space 56 when information indicating availability of the parking space 56 is switched to "reserved" on signage in the parking lot 51, the car navigation device, or the application of the smartphone. The plan proposal device 20 may temporarily reserve the parking space 56 only when the user U1 has checked an item "Request parking space guidance" in a pre-questionnaire. The plan proposal device 20 may temporarily reserve the parking space 56 even when the user U1 does not set a destination.

The plan proposal device 20 may provide availability guidance that can be viewed at any time. For example, the user U1 need not search for the available parking spaces 55 by himself/herself when the parking space availability is displayed on the car navigation device or the application of the smartphone at a timing when the vehicle 12 enters the ground from the intersection 62. The availability may be updated in real time.

In the parking lot 51, manually driven vehicles and AVs may be mixed. The term "AV" is an abbreviation for "autonomous vehicle".

Figure 4:
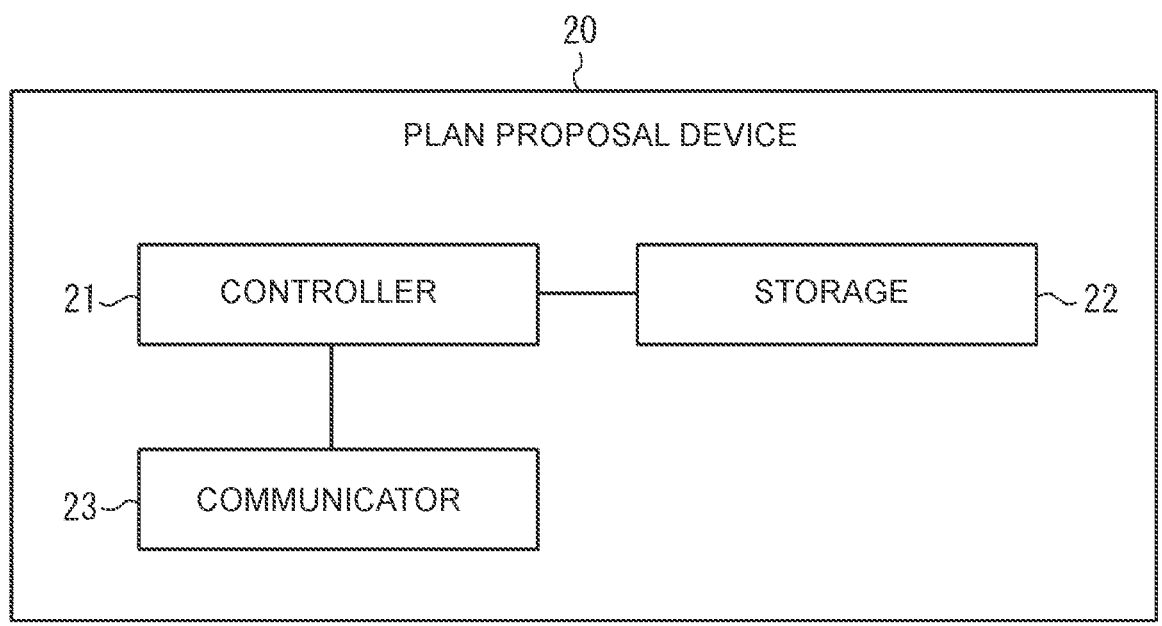
FIG. 4 is a block diagram illustrating a configuration of a plan proposal device according to the embodiment of the present disclosure.

The configuration of the plan proposal device 20 according to the present embodiment will be described with reference to FIG. 4.

The plan proposal device 20 includes a controller 21, a storage 22, and a communicator 23.

The controller 21 includes at least one processor, at least one programmable circuit, at least one dedicated circuit, or any combination thereof. The processor is a general-purpose processor such as a CPU or a GPU, or a processor dedicated to specific processes. The term "CPU" is an abbreviation for "central processing unit". The term "GPU" is an abbreviation for "graphics processing unit". Examples of the programmable circuit include an FPGA. The term "FPGA" is an abbreviation for "field-programmable gate array". Examples of the dedicated circuit include an ASIC. The term "ASIC" is an abbreviation for "application specific integrated circuit". The controller 21 executes processes related to operations of the plan proposal device 20 while controlling individual parts of the plan proposal device 20.

The storage 22 includes at least one semiconductor memory, at least one magnetic memory, at least one optical memory, or any combination thereof. Examples of the semiconductor memory include a RAM and a ROM. The term "RAM" is an abbreviation for "random access memory". The term "ROM" is an abbreviation for "read only memory". Examples of the RAM include an SRAM and a DRAM. The term "SRAM" is an abbreviation for "static random access memory". The term "DRAM" is an abbreviation for "dynamic random access memory". Examples of the ROM include an EEPROM. The term "EEPROM" is an abbreviation for "electrically erasable programmable read only memory". For example, the storage 22 functions as a main storage, an auxiliary storage, or a cache memory. The storage 22 stores data to be used for the operations of the plan proposal device 20 and data obtained by the operations of the plan proposal device 20.

The communicator 23 includes at least one communication interface. Examples of the communication interface include a LAN interface. The communicator 23 receives data to be used for the operations of the plan proposal device 20, and transmits data obtained by the operations of the plan proposal device 20.

Functions of the plan proposal device 20 are implemented by executing a plan proposal program according to the present embodiment by the processor serving as the controller 21. That is, the functions of the plan proposal device 20 are implemented by software. The plan proposal program causes a computer to function as the plan proposal device 20 by causing the computer to execute the operations of the plan proposal device 20. That is, the computer functions as the plan proposal device 20 by executing the operations of the plan proposal device 20 based on the plan proposal program.

The program can be stored in a non-transitory computer-readable medium. Examples of the non-transitory computer-readable medium include a flash memory, a magnetic recording device, an optical disc, a magneto-optical recording medium, and a ROM. For example, the program is distributed by selling, transferring, or renting a portable medium storing the program, such as an SD card, a DVD, or a CD-ROM. The term "SD" is an abbreviation for "secure digital". The term "DVD" is an abbreviation for "digital versatile disc". The term "CD-ROM" is an abbreviation for "compact disc read only memory". The program may be distributed by storing the program in a storage of a server and transferring the program from the server to other computers. The program may be provided as a program product.

For example, the computer first stores, in the main storage, the program stored in the portable medium or transferred from the server. The computer then causes the processor to read the program stored in the main storage and execute processes based on the read program. The computer may read the program directly from the portable medium and execute the processes based on the program. The computer may execute the processes based on the received program every time the program is transferred from the server to the computer. The processes may be executed by a so-called ASP service in which the functions are implemented only by execution instructions and result acquisition without transferring the program from the server to the computer. The term "ASP" is an abbreviation for "application service provider". The program includes information that is provided for processing by an electronic computer and equivalent to the program. For example, data that is not a direct command to the computer but has the property of defining the processing of the computer is the "information equivalent to the program".

A part or all of the functions of the plan proposal device 20 may be implemented by a programmable circuit or a dedicated circuit that serves as the controller 21. That is, a part or all of the functions of the plan proposal device 20 may be implemented by hardware.

Figure 5:
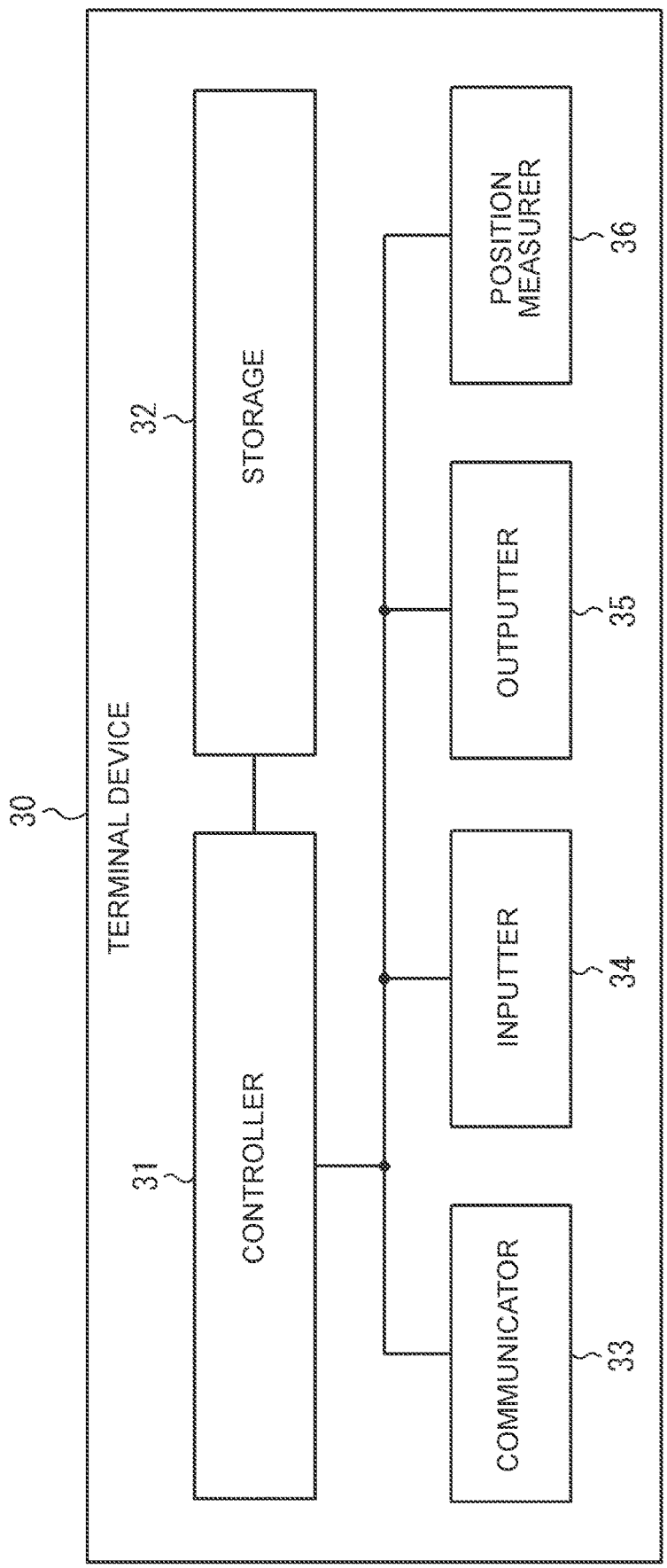
FIG. 5 is a block diagram illustrating a configuration of a terminal device according to the embodiment of the present disclosure.

The configuration of the terminal device 30 according to the present embodiment will be described with reference to FIG. 5.

The terminal device 30 includes a controller 31, a storage 32, a communicator 33, an inputter 34, an outputter 35, and a position measurer 36.

The controller 31 includes at least one processor, at least one programmable circuit, at least one dedicated circuit, or any combination thereof. The processor is a general-purpose processor such as a CPU or a GPU, or a processor dedicated to specific processes. Examples of the programmable circuit include an FPGA. Examples of the dedicated circuit include an ASIC. The controller 31 executes processes related to operations of the terminal device 30 while controlling individual parts of the terminal device 30.

The storage 32 includes at least one semiconductor memory, at least one magnetic memory, at least one optical memory, or any combination thereof. Examples of the semiconductor memory include a RAM and a ROM. Examples of the RAM include an SRAM and a DRAM. Examples of the ROM include an EEPROM. For example, the storage 32 functions as a main storage, an auxiliary storage, or a cache memory. The storage 32 stores data to be used for the operations of the terminal device 30 and data obtained by the operations of the terminal device 30.

The communicator 33 includes at least one communication interface. Examples of the communication interface include an interface conforming to a mobile communication standard such as LTE, 4G, or 5G, an interface conforming to a short-range wireless communication standard such as Bluetooth (registered trademark), and a LAN interface. The term "LTE" is an abbreviation for "Long Term Evolution". The term "4G" is an abbreviation for "fourth generation". The term "5G" is an abbreviation for "fifth generation". The communicator 33 receives data to be used for the operations of the terminal device 30, and transmits data obtained by the operations of the terminal device 30.

The inputter 34 includes at least one input interface. Examples of the input interface include physical keys, capacitive keys, a pointing device, a touchscreen integrated with a display, a camera, LiDAR, and a microphone. The term "LiDAR" is an abbreviation for "light detection and ranging". The inputter 34 receives an operation for inputting data to be used for the operations of the terminal device 30. The inputter 34 may be connected to the terminal device 30 as an external input device instead of being provided in the terminal device 30. Examples of a connection interface include an interface conforming to a standard such as USB, HDMI (registered trademark), or Bluetooth (registered trademark). The term "USB" is an abbreviation for "universal serial bus". The term "HDMI (registered trademark)" is an abbreviation for "high-definition multimedia interface".

The outputter 35 includes at least one output interface. Examples of the output interface include a display and a loudspeaker. Examples of the display include an LCD and an organic EL display. The term "LCD" is an abbreviation for "liquid crystal display". The term "EL" is an abbreviation for "electroluminescence". The outputter 35 outputs data obtained by the operations of the terminal device 30. The outputter 35 may be connected to the terminal device 30 as an external output device instead of being provided in the terminal device 30. Examples of a connection interface include an interface conforming to a standard such as USB, HDMI (registered trademark), or Bluetooth (registered trademark).

The position measurer 36 includes at least one GNSS receiver. The term "GNSS" is an abbreviation for "global navigation satellite system". Examples of the GNSS include GPS, QZSS, BDS, GLONASS, and Galileo. The term "GPS" is an abbreviation for "global positioning system". The term "QZSS" is an abbreviation for "quasi-zenith satellite system". A satellite in the QZSS is called "quasi-zenith satellite". The term "BDS" is an abbreviation for "BeiDou navigation satellite system". The term "GLONASS" is an abbreviation for "global navigation satellite system". The position measurer 36 measures a position of the terminal device 30.

Functions of the terminal device 30 are implemented by executing a terminal program according to the present embodiment by the processor serving as the controller 31. That is, the functions of the terminal device 30 are implemented by software. The terminal program causes a computer to function as the terminal device 30 by causing the computer to execute the operations of the terminal device 30. That is, the computer functions as the terminal device 30 by executing the operations of the terminal device 30 based on the terminal program.

A part or all of the functions of the terminal device 30 may be implemented by a programmable circuit or a dedicated circuit that serves as the controller 31. That is, a part or all of the functions of the terminal device 30 may be implemented by hardware.

Figure 6:
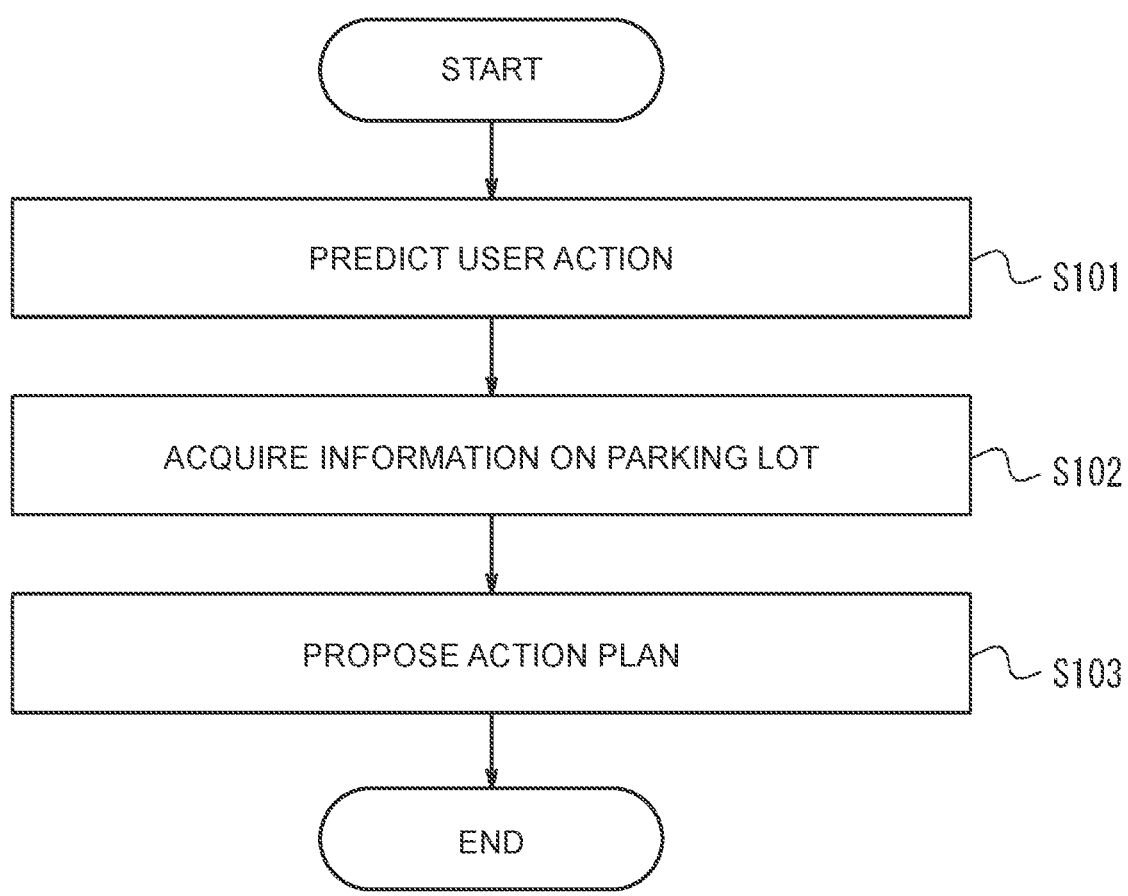
FIG. 6 is a flowchart illustrating operations of the plan proposal device according to the embodiment of the present disclosure.

Operations of the system 10 according to the present embodiment will be described with reference to FIG. 6. The operations correspond to a plan proposal method according to the present embodiment. FIG. 6 illustrates the operations of the plan proposal device 20.

In Step S101, the controller 21 of the plan proposal device 20 predicts an action of the user U1 in the period P as a user action. The user action includes parking the vehicle 12 in the parking lot 51. Although the process of Step S101 may be executed by any procedure, the process is executed by the following procedure in the present embodiment.

The controller 21 of the plan proposal device 20 acquires attribute data D2. The attribute data D2 is data indicating attributes of the user U1. Examples of the attributes include classification, place of residence, family structure, age, gender, type of the vehicle 12, hobbies, preferences, presence or absence of handicaps, or any combination thereof. Examples of the classification include a resident, a worker, and a visitor. The attribute data D2 may be acquired by any method. In the present embodiment, the attribute data D2 is acquired by presenting a questionnaire for determining attributes to the user U1 and analyzing answers to the presented questionnaire. As a method for answer analysis, a known method can be used. Machine learning such as deep learning may be used.

The controller 21 of the plan proposal device 20 predicts the user action based on the acquired attribute data D2. The user action may be predicted by any method. In the present embodiment, the user action is predicted by inputting the attribute data D2 to a prediction model for predicting the action and acquiring a prediction result from the prediction model. The controller 21 generates or updates the prediction model by performing machine learning while associating data indicating action records of the users 11 with data indicating attributes of the users 11. The action records of the users 11 include dates and times when the users U2, . . . , Un parked the vehicles in the parking lot 51 in the past. The action records of the users 11 may include points that the users U2, . . . , Un visited in the past before or after parking the vehicles in the parking lot 51. The action records of the users 11 may include actions that the users U2, . . . , Un took in the past after parking the vehicles in the parking lot 51. For example, teacher data for machine learning can be created by associating the past actions of the users U2, . . . , Un with the attributes of the users U2, . . . , Un as labels. A trained model can be generated as the prediction model by performing machine learning with this teacher data by a known algorithm.

The user action may be predicted based on an analysis result obtained by analyzing an action tendency of the user U1 in place of or together with the attribute data D2. In such a modification, the controller 21 of the plan proposal device 20 acquires record data D3. The record data D3 is data indicating action records of the user U1. The action records of the user U1 include dates and times when the user U1 parked the vehicle 12 in the parking lot 51 in the past. The action records of the user U1 may include points that the user U1 visited in the past before or after parking the vehicle 12 in the parking lot 51. The action records of the user U1 may include actions that the user U1 took in the past after parking the vehicle 12 in the parking lot 51. The record data D3 may be acquired by any method. In this modification, the record data D3 is acquired by acquiring, from the terminal device 30, time series data of positions measured by the position measurer 36 of the terminal device 30 and determining a series of actions of the user U1 based on a movement path of the user U1 indicated by the acquired time series data. As a method for action determination, a known method can be used. Machine learning such as deep learning may be used.

The controller 21 of the plan proposal device 20 analyzes the action tendency of the user U1 based on the acquired record data D3. For example, the action tendency of the user U1 includes a point that the user U1 visits by the vehicle 12 after the vehicle 12 exits the parking lot 51, such as the convenience store 61 or the house outside the town 50, or a destination where the user U1 goes after parking the vehicle 12 in the parking lot 51, such as a house or an office. The action tendency of the user U1 may include a last-mile tendency including information about whether the user U1 moves from the parking lot 51 to the destination on foot or by using the last-mile mobility, and a type of the last-mile mobility when the user U1 moves by using the last-mile mobility. The action tendency of the user U1 may include a parking tendency including a parking position such as a position near an entrance, near an exit, near stairs, near an elevator, or on the floor, information about whether the user U1 follows a parking instruction, the number of occupants, information about whether charging equipment is used, or a parking method indicating whether the vehicle faces forward or backward. The action tendency may be analyzed by any method. In this modification, the action tendency is analyzed by inputting the record data D3 into a trained model and acquiring an analysis result from the trained model.

The controller 21 of the plan proposal device 20 predicts the user action based on the obtained analysis result. That is, in this modification, the user action is predicted by determining an action that the user U1 is likely to take based on the action tendency of the user U1.

The user action may be predicted based on schedule data D4 in place of or together with the attribute data D2. In such a modification, the controller 21 of the plan proposal device 20 acquires the schedule data D4. The schedule data D4 is data indicating a schedule of the user U1. The schedule includes dates and times when the user U1 will park the vehicle 12 in the parking lot 51 in the future. The schedule may include points that the user U1 will visit in the future before or after parking the vehicle 12 in the parking lot 51. The schedule may include actions that the user U1 will take in the future after parking the vehicle 12 in the parking lot 51. The schedule data D4 may be acquired by any method. In this modification, the schedule data D4 is acquired by acquiring data registered in a calendar application of the user U1 from the terminal device 30 as the schedule data D4.

The controller 21 of the plan proposal device 20 predicts the user action based on the acquired schedule data D4. That is, in this modification, the user action is predicted by determining an action that the user U1 is scheduled to take based on the schedule of the user U1.

In Step S102, the controller 21 of the plan proposal device 20 acquires information on the parking lot 51 in the period P.

In Step S103, the controller 21 of the plan proposal device 20 generates proposal data D1 based on the prediction result obtained in Step S101 and the information on the parking lot 51 acquired in Step S102. The proposal data D1 is data for proposing an action plan in the period P. The controller 21 outputs the generated proposal data D1 to the communicator 23. The communicator 23 transmits the proposal data D1 to the terminal device 30.

The communicator 33 of the terminal device 30 receives the proposal data D1 transmitted in Step S103 from the plan proposal device 20. The controller 31 of the terminal device 30 acquires the proposal data D1 received by the communicator 33. The controller 31 presents the acquired proposal data D1 to the user U1. Any method may be used as a method for presenting the proposal data D1 to the user U1. The present embodiment uses a method of displaying contents of the proposal data D1 on the display serving as the outputter 35, a method of outputting the contents of the proposal data D1 by voice and sound from the loudspeaker serving as the outputter 35, or both of these methods.

A specific example of the operations of the plan proposal device 20 will be described.

Figure 7:
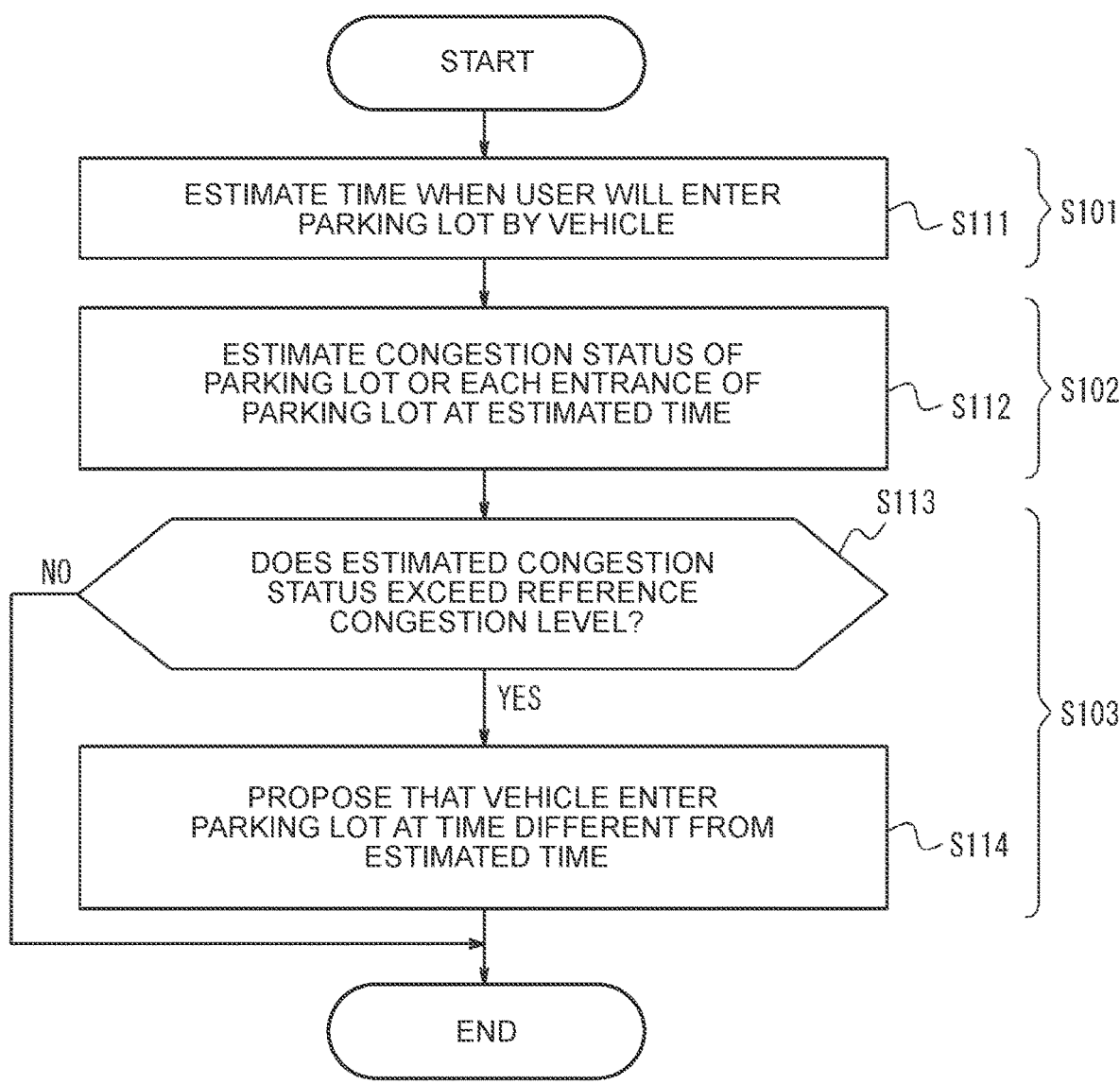
FIG. 7 is a flowchart illustrating a first example of the operations of the plan proposal device according to the embodiment of the present disclosure.

A first example of the operations of the plan proposal device 20 will be described with reference to FIG. 7.

Processes of Steps S111 and S112 are specific examples of the processes of Steps S101 and S102 illustrated in FIG. 6, respectively. Processes of Steps S113 and S114 are specific examples of the process of Step S103 illustrated in FIG. 6.

In Step S111, the controller 21 of the plan proposal device 20 estimates a time when the user U1 will enter the parking lot 51 by the vehicle 12 in the period P. That is, a prediction result obtained in Step S111 includes an estimated time T1 when the user U1 will enter the parking lot 51 by the vehicle 12.

In Step S112, the controller 21 of the plan proposal device 20 estimates a congestion status of the parking lot 51 or each entrance of the parking lot 51 at the estimated time T1. That is, information on the parking lot 51 acquired in Step S112 includes an estimated congestion status C1 of the parking lot 51 or each entrance of the parking lot 51 at the estimated time T1.

Specifically, the controller 21 of the plan proposal device 20 predicts actions of the users U2, ..., Un in the period P as third-party actions. The third-party actions include parking in the parking lot 51. Any method may be used as a method for predicting the third-party action. This example uses a method similar to the method for predicting the user action. That is, the third-party actions are predicted by inputting data indicating the attributes of the users U2, ..., Un into the prediction model for predicting the actions and acquiring a prediction result from the prediction model. As a modification of this example, the third-party actions may be predicted by determining actions that the users U2, ..., Un are likely to take based on action tendencies of the users U2, ..., Un. Alternatively, the third-party actions may be predicted by determining actions that the users U2, ..., Un are scheduled to take based on schedules of the users U2, ..., Un.

The controller 21 calculates the estimated congestion status C1 based on the obtained prediction result. The estimated congestion status C1 may be calculated by any method. In this example, the estimated congestion status C1 is calculated by counting, among the users U2, ..., Un, the number of users who are predicted to enter the parking lot 51 by vehicles within a period ranging between the estimated time T1 and a time that is several minutes before the estimated time T1. The estimated congestion status C1 may be calculated based on information such as traffic volume supply and demand or external factors such as weather or temperature, together with the prediction result obtained for the third-party actions.

In Step S113, the controller 21 of the plan proposal device 20 determines whether the estimated congestion status C1 exceeds a reference congestion level. When the estimated congestion status C1 exceeds the reference congestion level, the process of Step S114 is executed. When the estimated congestion status C1 does not exceed the reference congestion level, the flow of FIG. 7 is terminated.

In Step S114, the controller 21 of the plan proposal device 20 proposes that the vehicle 12 enter the parking lot 51 at a time different from the estimated time T1. That is, the controller 21 includes the entry of the vehicle 12 into the parking lot 51 at the time different from the estimated time T1 in the action plan proposed by the proposal data D1. The controller 21 may output notification data D5 together with the proposal data D1 to the communicator 23. The notification data D5 is data for notifying the user about the estimated congestion status C1. The communicator 23 may transmit the notification data D5 together with the proposal data D1 to the terminal device 30.

The communicator 33 of the terminal device 30 may receive the notification data D5 together with the proposal data D1 from the plan proposal device 20. The controller 31 of the terminal device 30 may present the notification data D5 to the user U1 together with the proposal data D1.

According to this example, when prediction is made that the parking lot 51 or the entrance of the parking lot 51 will be congested at the estimated time T1, the entry of the vehicle 12 into the parking lot 51 at the different time can be proposed to the user U1. As a result, satisfaction of the user U1 is improved. Congestion at the parking lot 51 or the entrance of the parking lot 51 can also be eliminated. A traffic jam near the parking lot 51 can also be reduced.

Figure 8:
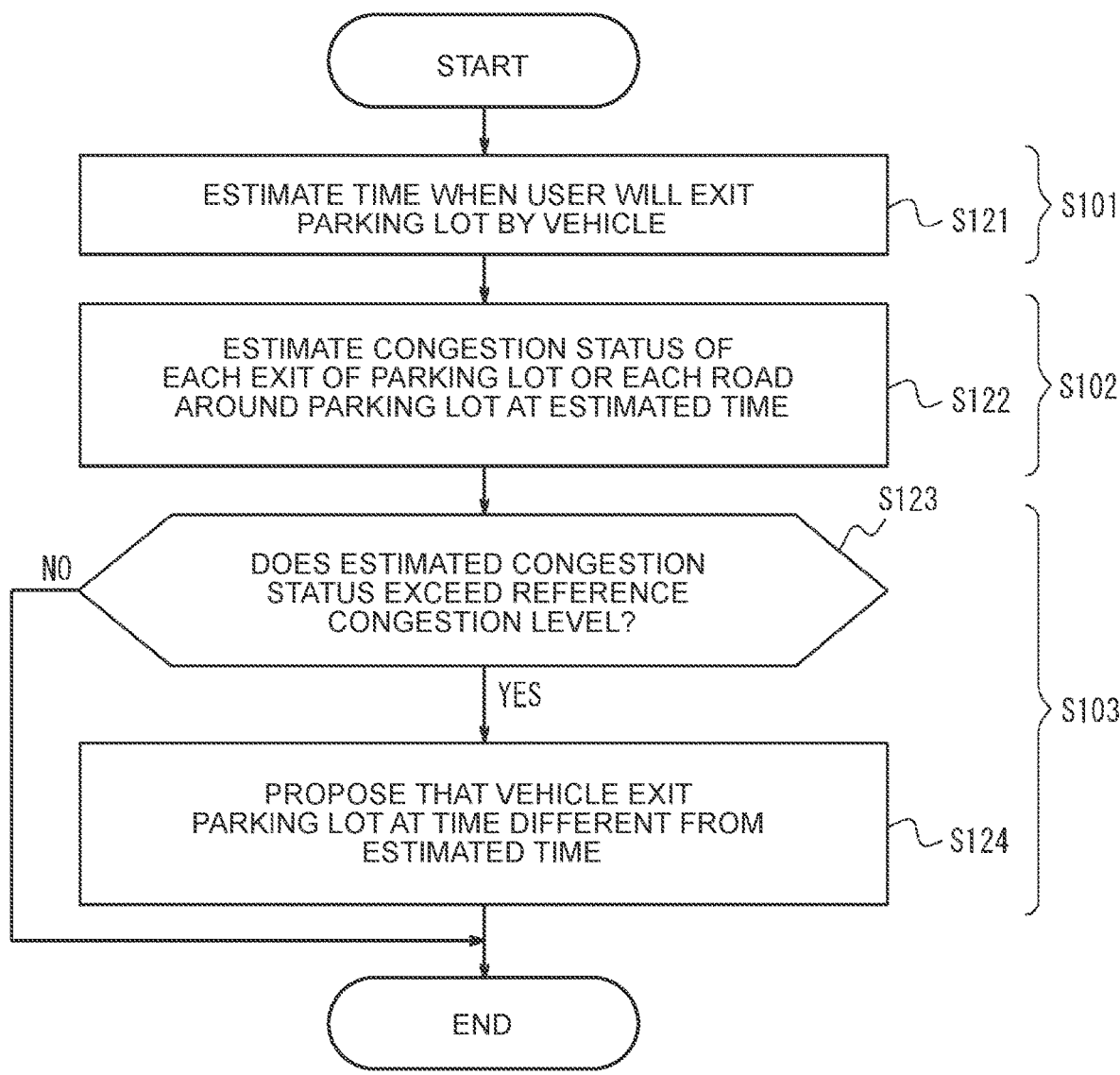
FIG. 8 is a flowchart illustrating a second example of the operations of the plan proposal device according to the embodiment of the present disclosure.

A second example of the operations of the plan proposal device 20 will be described with reference to FIG. 8.

Processes of Steps S121 and S122 are specific examples of the processes of Steps S101 and S102 illustrated in FIG. 6, respectively. Processes of Steps S123 and S124 are specific examples of the process of Step S103 illustrated in FIG. 6.

In Step S121, the controller 21 of the plan proposal device 20 estimates a time when the user U1 will exit the parking lot 51 by the vehicle 12 in the period P. That is, a prediction result obtained in Step S121 includes an estimated time T2 when the user U1 will exit the parking lot 51 by the vehicle 12.

In Step S122, the controller 21 of the plan proposal device 20 estimates a congestion status of each exit of the parking lot 51 or each road around the parking lot 51 at the estimated time T2. That is, information on the parking lot 51 acquired in Step S122 includes an estimated congestion status C2 of each exit of the parking lot 51 or each road around the parking lot 51 at the estimated time T2.

Specifically, the controller 21 of the plan proposal device 20 predicts actions of the users U2, ..., Un in the period P as third-party actions. The third-party actions include parking in the parking lot 51. Since the method for predicting the third-party actions is the same as the method used in the first example, description thereof will be omitted.

The controller 21 calculates the estimated congestion status C2 based on the obtained prediction result. The estimated congestion status C2 may be calculated by any method. In this example, the estimated congestion status C2 is calculated by counting, among the users U2, ..., Un, the number of users who are predicted to exit the parking lot 51 by vehicles within a period ranging between the estimated time T2 and a time that is several minutes before the estimated time T2. The estimated congestion status C2 may be calculated based on information such as traffic volume supply and demand or external factors such as weather or temperature, together with the prediction result obtained for the third-party actions.

In Step S123, the controller 21 of the plan proposal device 20 determines whether the estimated congestion status C2 exceeds the reference congestion level. When the estimated congestion status C2 exceeds the reference congestion level, the process of Step S124 is executed. When the estimated congestion status C2 does not exceed the reference congestion level, the flow of FIG. 8 is terminated.

In Step S124, the controller 21 of the plan proposal device 20 proposes that the vehicle 12 exit the parking lot 51 at a time different from the estimated time T2. That is, the controller 21 includes the exit of the vehicle 12 from the parking lot 51 at the time different from the estimated time T2 in the action plan proposed by the proposal data D1. The controller 21 may output notification data D6 together with the proposal data D1 to the communicator 23. The notification data D6 is data for notifying the user about the estimated congestion status C2. The communicator 23 may transmit the notification data D6 together with the proposal data D1 to the terminal device 30.

The communicator 33 of the terminal device 30 may receive the notification data D6 together with the proposal data D1 from the plan proposal device 20. The controller 31 of the terminal device 30 may present the notification data D6 to the user U1 together with the proposal data D1.

According to this example, when prediction is made that the exit of the parking lot 51 or the road around the parking lot 51 will be congested at the estimated time T2, the exit of the vehicle 12 from the parking lot 51 at the different time can be proposed to the user U1. As a result, satisfaction of the user U1 is improved. Congestion at the exit of the parking lot 51 can also be eliminated. A traffic jam near the parking lot 51 can also be reduced.

Figure 9:
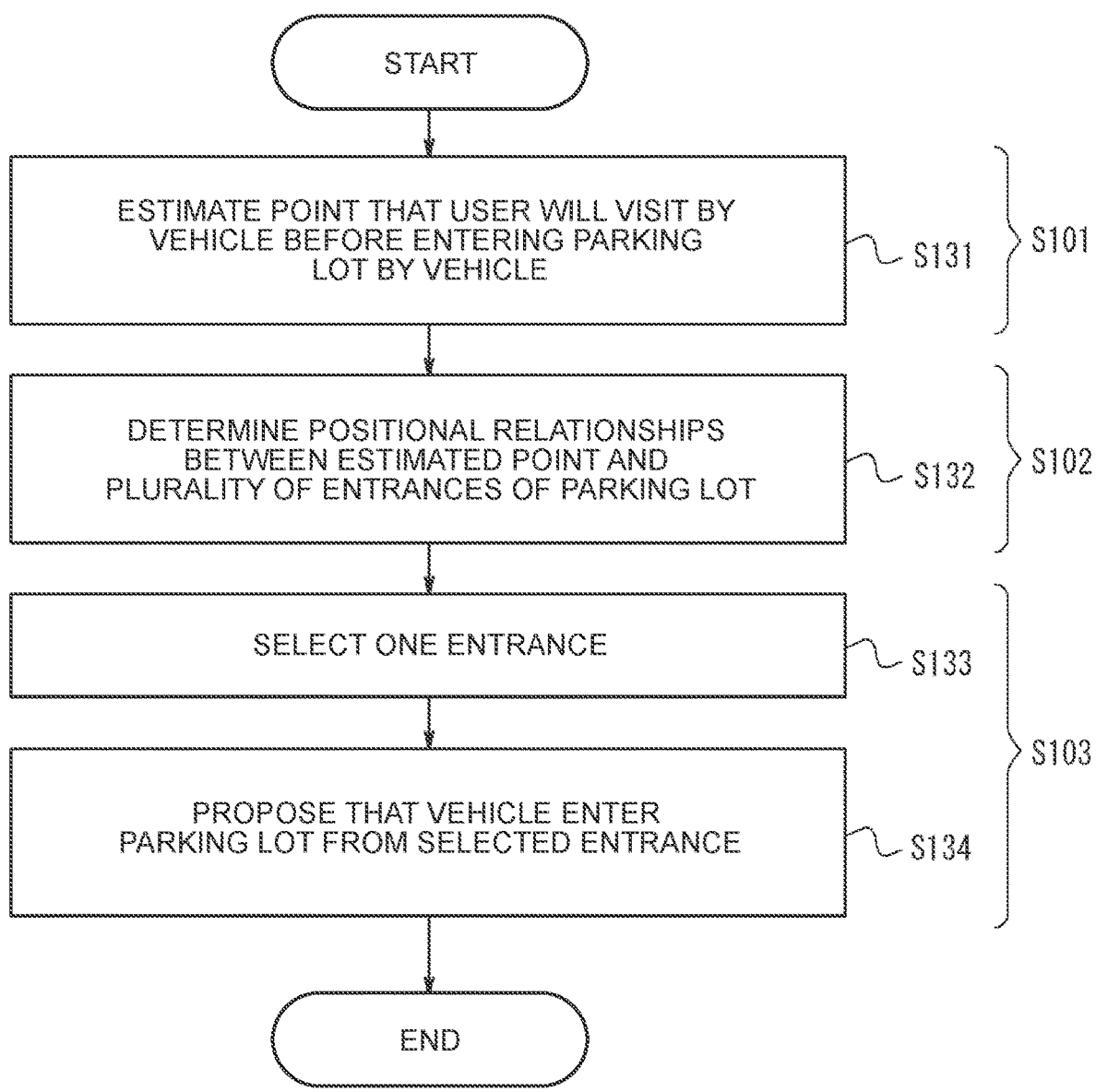
FIG. 9 is a flowchart illustrating a third example of the operations of the plan proposal device according to the embodiment of the present disclosure.

A third example of the operations of the plan proposal device 20 will be described with reference to FIG. 9.

Processes of Steps S131 and S132 are specific examples of the processes of Steps S101 and S102 illustrated in FIG. 6, respectively. Processes of Steps S133 and S134 are specific examples of the process of Step S103 illustrated in FIG. 6.

In Step S131, the controller 21 of the plan proposal device 20 estimates a point that the user U1 will visit by the vehicle 12 before entering the parking lot 51 by the vehicle 12 in the period P. That is, a prediction result obtained in Step S131 includes an estimated point L1 that the user U1 will visit by the vehicle 12 before entering the parking lot 51 by the vehicle 12.

In Step S132, the controller 21 of the plan proposal device 20 determines positional relationships between the estimated point L1 and the entrances of the parking lot 51. That is, information on the parking lot 51 acquired in Step S132 includes the positional relationships between the estimated point L1 and the entrances of the parking lot 51. The positional relationships may be determined by any method. In this example, the positional relationships are determined by calculating distances between the estimated point L1 and the entrances N1, N2, and N3 illustrated in FIG. 2 with reference to map data D7. The map data D7 may be prestored in the storage 22 of the plan proposal device 20 or accumulated in an external system such as a GIS on the Internet. The term "GIS" is an abbreviation for "geographic information system".

In Step S133, the controller 21 of the plan proposal device 20 selects one entrance from among the entrances of the parking lot 51 based on the positional relationships determined in Step S132. For example, assuming that the estimated point L1 is the convenience store 61 illustrated in FIG. 2, the entrance N3 is selected because the entrance N3 is closest to the convenience store 61.

In Step S134, the controller 21 of the plan proposal device 20 proposes that the vehicle 12 enter the parking lot 51 from the entrance selected in Step S133. That is, the controller 21 includes the entry of the vehicle 12 from the selected entrance in the action plan proposed by the proposal data D1.

According to this example, when prediction is made that the user U1 will visit the estimated point L1 by the vehicle 12 and then enter the parking lot 51 by the vehicle 12, the use of a convenient entrance for the entry into the parking lot 51 from the estimated point L1 can be proposed to the user U1. As a result, satisfaction of the user U1 is improved.

Figure 10:
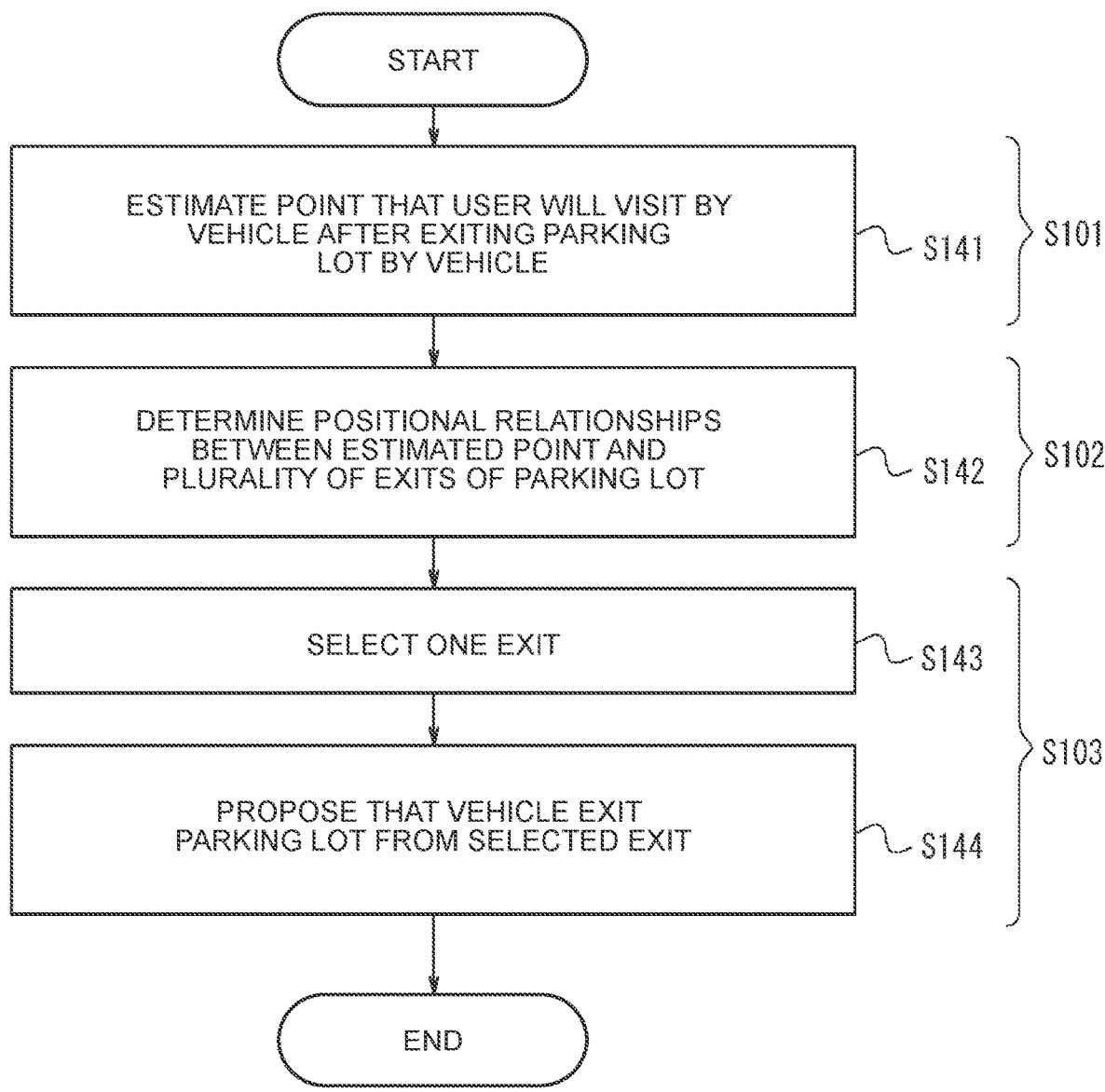
FIG. 10 is a flowchart illustrating a fourth example of the operations of the plan proposal device according to the embodiment of the present disclosure.

A fourth example of the operations of the plan proposal device 20 will be described with reference to FIG. 10.

Processes of Steps S141 and S142 are specific examples of the processes of Steps S101 and S102 illustrated in FIG. 6, respectively. Processes of Steps S143 and S144 are specific examples of the process of Step S103 illustrated in FIG. 6.

In Step S141, the controller 21 of the plan proposal device 20 estimates a point that the user U1 will visit by the vehicle 12 after exiting the parking lot 51 by the vehicle 12 in the period P. That is, a prediction result obtained in Step S141 includes an estimated point L2 that the user U1 will visit by the vehicle 12 after exiting the parking lot 51 by the vehicle 12.

In Step S142, the controller 21 of the plan proposal device 20 determines positional relationships between the estimated point L2 and the exits of the parking lot 51. That is, information on the parking lot 51 acquired in Step S142 includes the positional relationships between the estimated point L2 and the exits of the parking lot 51. The positional relationships may be determined by any method. In this example, the positional relationships are determined by calculating distances between the estimated point L2 and the exits X1, X2, and X3 illustrated in FIG. 2 with reference to the map data D7.

In Step S143, the controller 21 of the plan proposal device 20 selects one exit from among the exits of the parking lot 51 based on the positional relationships determined in Step S142. For example, assuming that the estimated point L2 is the convenience store 61 illustrated in FIG. 2, the exit X3 is selected because the exit X3 is closest to the convenience store 61.

In Step S144, the controller 21 of the plan proposal device 20 proposes that the vehicle 12 exit the parking lot 51 from the exit selected in Step S143. That is, the controller 21 includes the exit of the vehicle 12 from the selected exit in the action plan proposed by the proposal data D1.

According to this example, when prediction is made that the user U1 will visit the estimated point L2 by the vehicle 12 after exiting the parking lot 51 by the vehicle 12, the use of a convenient exit for the visit to the estimated point L2 from the parking lot 51 can be proposed to the user U1. As a result, satisfaction of the user U1 is improved.

Figure 11:
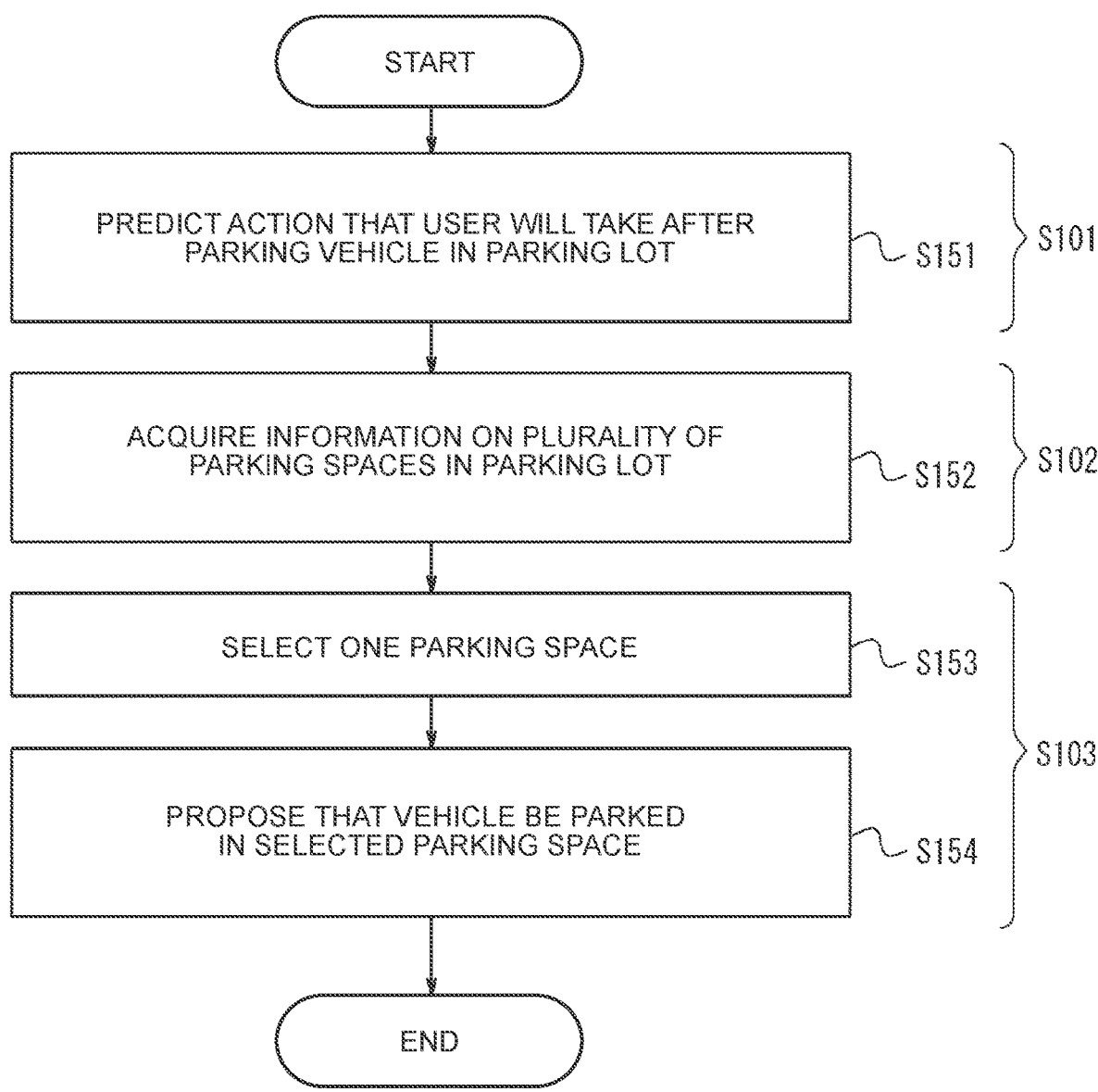
FIG. 11 is a flowchart illustrating a fifth example of the operations of the plan proposal device according to the embodiment of the present disclosure.

A fifth example of the operations of the plan proposal device 20 will be described with reference to FIG. 11.

Processes of Steps S151 and S152 are specific examples of the processes of Steps S101 and S102 illustrated in FIG. 6, respectively. Processes of Steps S153 and S154 are specific examples of the process of Step S103 illustrated in FIG. 6.

In Step S151, the controller 21 of the plan proposal device 20 predicts an action that the user U1 will take after parking the vehicle 12 in the parking lot 51 in the period P. That is, a prediction result obtained in Step S151 includes a predicted action to be taken by the user U1 after parking the vehicle 12 in the parking lot 51.

In Step S152, the controller 21 of the plan proposal device 20 acquires information on a plurality of parking spaces in the parking lot 51. That is, information on the parking lot 51 acquired in Step S152 includes the information on the parking spaces in the parking lot 51. The information on the parking spaces is prestored in the storage 22 of the plan proposal device 20 or an external storage. For example, the information on each parking space includes a position such as a position near an entrance, near an exit, near stairs, near an elevator, or on the floor, availability, information about whether charging equipment is installed, or information about whether the parking space is accessible to an AGV or a delivery robot.

In Step S153, the controller 21 of the plan proposal device 20 selects one parking space from among the parking spaces in the parking lot 51 based on the predicted action. For example, assuming that the predicted action is to shop in the town 50 and buy so many items that the items need to be transported by an AGV or a delivery robot, a parking space accessible to the AGV or the delivery robot is selected from among the available parking spaces in the parking lot 51.

In Step S154, the controller 21 of the plan proposal device 20 proposes that the vehicle 12 be parked in the parking space selected in Step S153. That is, the controller 21 includes the parking of the vehicle 12 in the selected parking space in the action plan proposed by the proposal data D1. The controller 21 may determine whether to propose the parking of the vehicle 12 in the selected parking space based on an analysis result obtained by analyzing the action tendency of the user U1. For example, the controller 21 may include the parking of the vehicle 12 in the selected parking space in the action plan only when the user U1 has a tendency to follow a parking instruction.

According to this example, it is possible to propose, to the user U1, the parking of the vehicle 12 in a parking space suitable for the action to be taken by the user U1 after the vehicle 12 is parked in the parking lot 51. As a result, satisfaction of the user U1 is improved.

Figure 12:
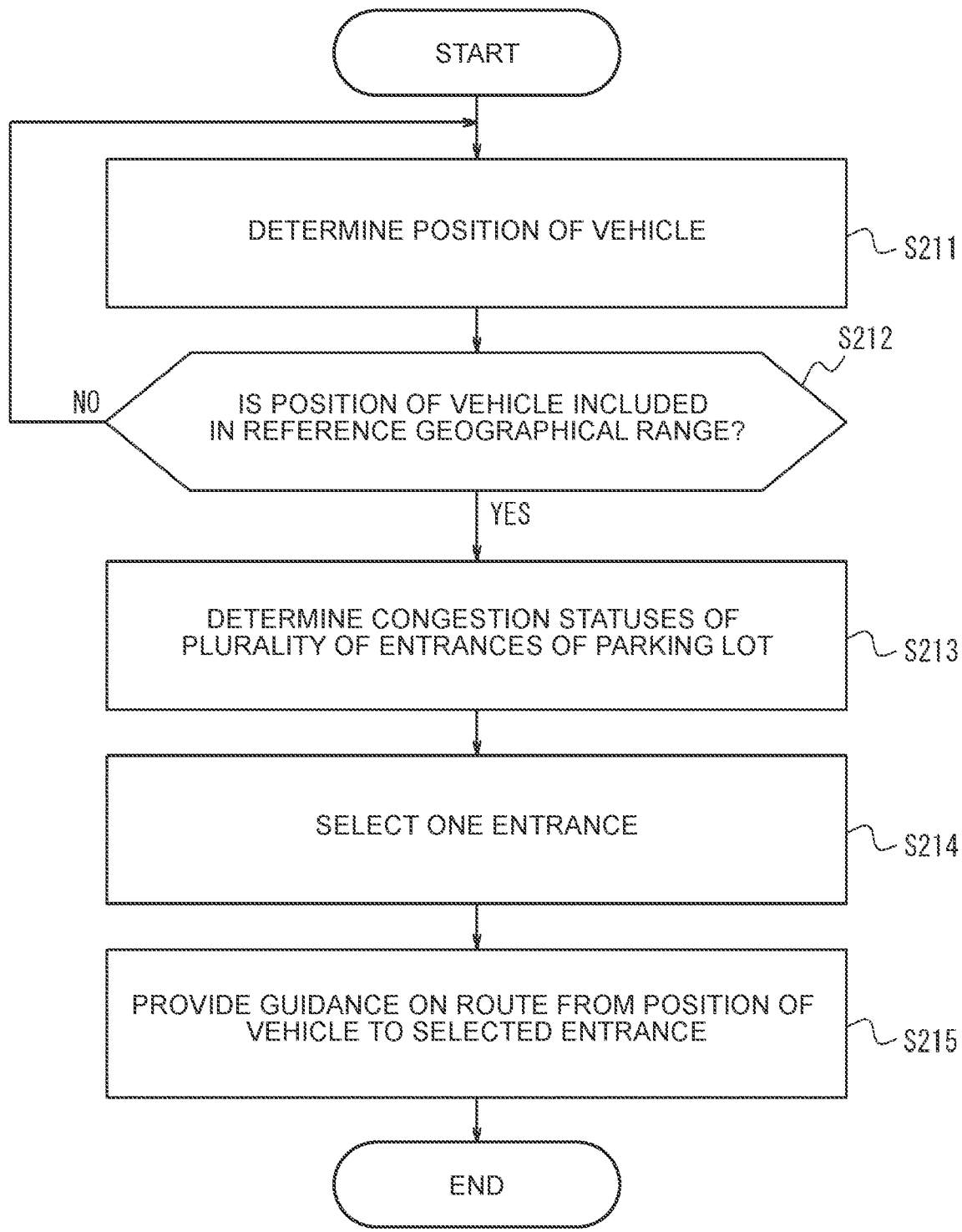
FIG. 12 is a flowchart illustrating operations of the plan proposal device according to the embodiment of the present disclosure.

The operations of the system 10 according to the present embodiment will further be described with reference to FIG. 12. FIG. 12 illustrates the operations of the plan proposal device 20.

In Step S211, the controller 21 of the plan proposal device 20 determines a position of the vehicle 12. Although this process may be executed by any procedure, the process is executed by the following procedure in the present embodiment.

The position measurer 36 of the terminal device 30 measures a position of the terminal device 30. The controller 31 of the terminal device 30 causes the communicator 33 to transmit position data D8. The position data D8 is data indicating the position measured by the position measurer 36 as the position of the vehicle 12. The communicator 33 transmits the position data D8 to the plan proposal device 20.

The communicator 23 of the plan proposal device 20 receives the position data D8 from the terminal device 30. The controller 21 of the plan proposal device 20 determines the position of the vehicle 12 by acquiring the position data D8 received by the communicator 23.

In Step S212, the controller 21 of the plan proposal device 20 refers to the map data D7 and determines whether the position of the vehicle 12 determined in Step S211 is included in a reference geographical range G1. The geographical range G1 may be any range set around the parking lot 51. In the example of FIG. 2, the geographical range G1 is a range of 1 km from the intersection 62. When the position of the vehicle 12 is included in the geographical range G1, a process of Step S213 is executed. When the position of the vehicle 12 is not included in the geographical range G1, the process of Step S211 is repeated.

In Step S213, the controller 21 of the plan proposal device 20 determines congestion statuses of the entrances of the parking lot 51. The congestion status may be determined by any method. In the present embodiment, the congestion status of each entrance is determined by analyzing an image obtained by an imaging device such as a camera or LiDAR installed at each entrance. As a method for image analysis, a known method can be used. Machine learning such as deep learning may be used.

In Step S214, the controller 21 of the plan proposal device 20 selects one entrance from among the entrances of the parking lot 51 based on the congestion statuses determined in Step S213. For example, the entrance N1 is selected assuming that the entrance N1 is shortest among the entrances N1, N2, and N3 illustrated in FIG. 2 in terms of the total of a period required from the position of the vehicle 12 and a delay caused by the congestion status of the entrance.

In Step S215, the controller 21 of the plan proposal device 20 generates guidance data D9. The guidance data D9 is data for providing guidance on a route from the position of the vehicle 12 determined in Step S211 to the entrance selected in Step S214. For example, when the entrance N1 is selected in Step S214, guidance is provided on the route 63 illustrated in FIG. 2. The controller 21 outputs the generated guidance data D9 to the communicator 23. The communicator 23 transmits the guidance data D9 to the terminal device 30.

The communicator 33 of the terminal device 30 receives the guidance data D9 transmitted in Step S215 from the plan proposal device 20. The controller 31 of the terminal device 30 acquires the guidance data D9 received by the communicator 33. The controller 31 presents the acquired guidance data D9 to the user U1. Any method may be used as a method for presenting the guidance data D9 to the user U1. The present embodiment uses a method of displaying contents of the guidance data D9 on the display serving as the outputter 35, a method of outputting the contents of the guidance data D9 by voice and sound from the loudspeaker serving as the outputter 35, or both of these methods.

Figure 13:
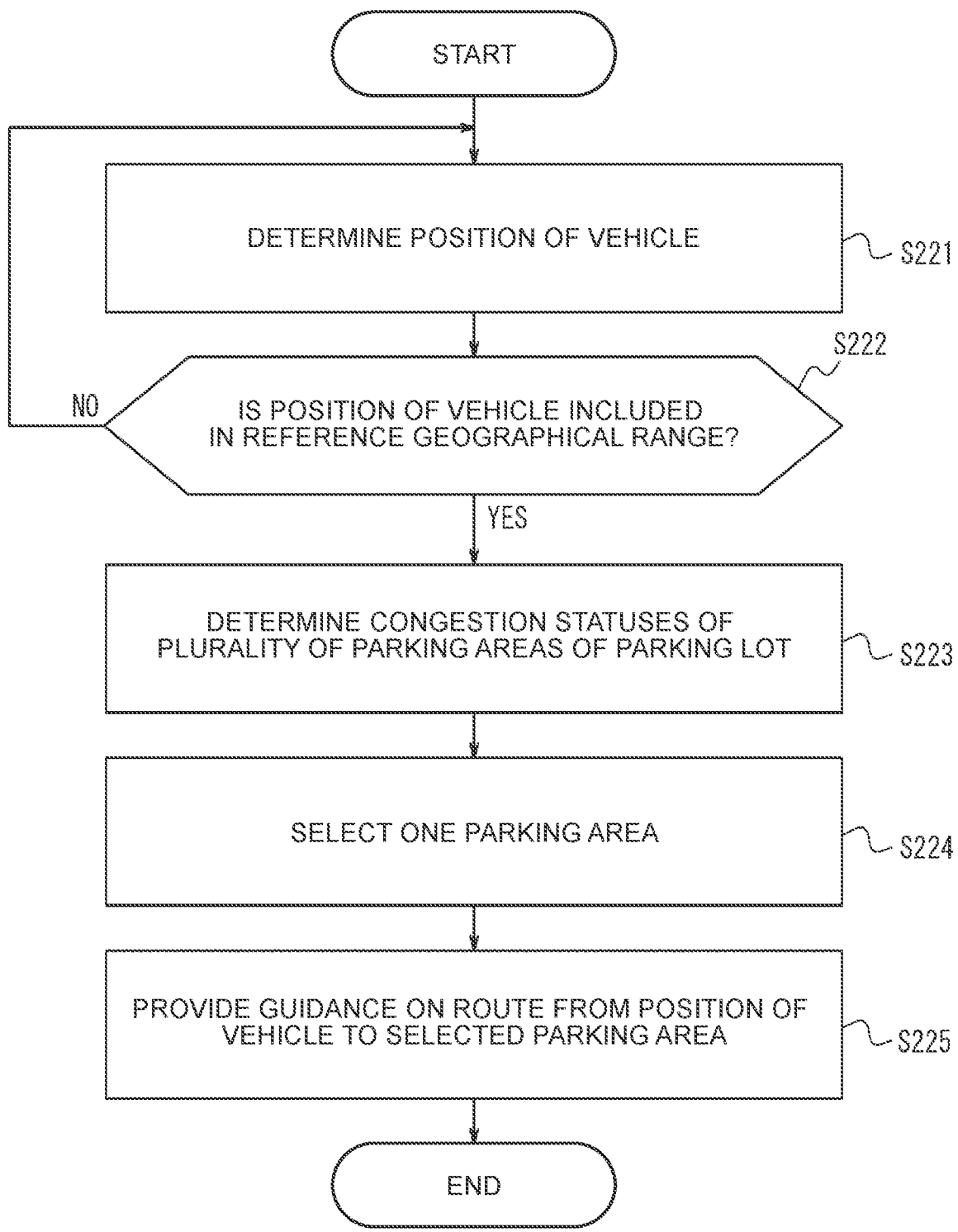
FIG. 13 is a flowchart illustrating operations of a plan proposal device according to a modification of the embodiment of the present disclosure.

The guidance route may be selected based on congestion statuses of the parking areas of the parking lot 51 in place of the congestion statuses of the entrances of the parking lot 51. Operations of the system 10 according to such a modification will be described with reference to FIG. 13. FIG. 13 illustrates operations of the plan proposal device 20.

Processes of Steps S221 and S222 are the same as the processes of Steps S211 and S212, respectively, and thus description thereof will be omitted. When the position of the vehicle 12 determined in Step S221 is included in the geographical range G1, a process of Step S223 is executed. When the position of the vehicle 12 is not included in the geographical range G1, the process of Step S221 is repeated.

In Step S223, the controller 21 of the plan proposal device 20 determines congestion statuses of the parking areas of the parking lot 51. The congestion status may be determined by any method. In the present embodiment, the congestion status of each parking area is determined by analyzing an image obtained by an imaging device such as a camera or LiDAR installed at each parking area. As a method for image analysis, a known method can be used. Machine learning such as deep learning may be used.

In Step S224, the controller 21 of the plan proposal device 20 selects one parking area from among the parking areas of the parking lot 51 based on the congestion statuses determined in Step S223. For example, the parking area A1 is selected assuming that the parking area A1 is shortest of the parking areas A1 and A2 illustrated in FIG. 2 in terms of the total of a period required from the position of the vehicle 12 and a delay caused by the congestion status of the parking area.

In Step S225, the controller 21 of the plan proposal device 20 generates guidance data D10. The guidance data D10 is data for providing guidance on a route from the position of the vehicle 12 determined in Step S221 to the parking area selected in Step S224. For example, when the parking area A1 is selected in Step S224, guidance is provided on the route 63 illustrated in FIG. 2. The controller 21 outputs the generated guidance data D10 to the communicator 23. The communicator 23 transmits the guidance data D10 to the terminal device 30.

The communicator 33 of the terminal device 30 receives the guidance data D10 transmitted in Step S225 from the plan proposal device 20. The controller 31 of the terminal device 30 acquires the guidance data D10 received by the communicator 33. The controller 31 presents the acquired guidance data D10 to the user U1. Any method may be used as a method for presenting the guidance data D10 to the user U1. The present embodiment uses a method of displaying contents of the guidance data D10 on the display serving as the outputter 35, a method of outputting the contents of the guidance data D10 by voice and sound from the loudspeaker serving as the outputter 35, or both of these methods.

Figure 14:
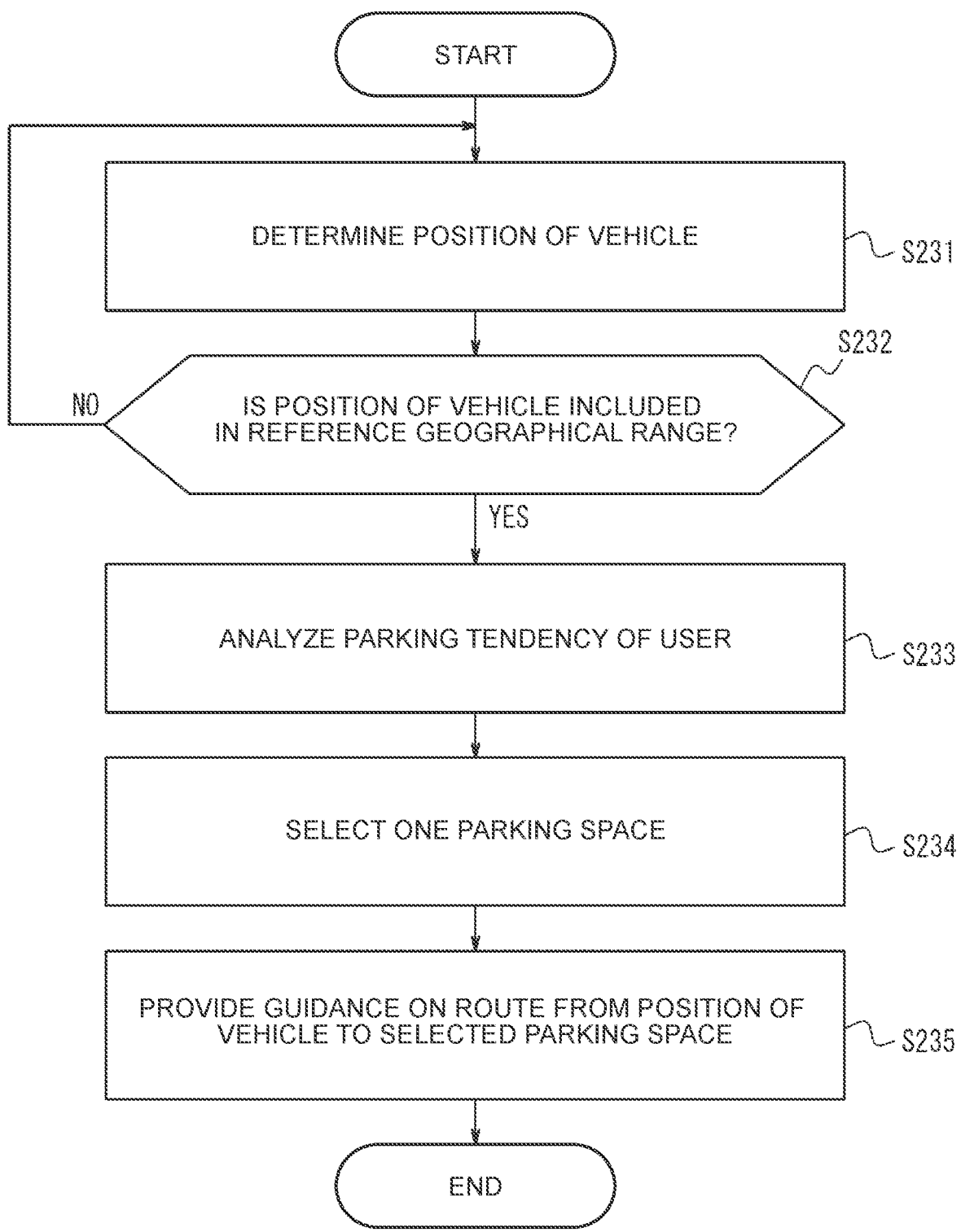
FIG. 14 is a flowchart illustrating operations of the plan proposal device according to the embodiment of the present disclosure.

The operations of the system 10 according to the present embodiment will further be described with reference to FIG. 14. FIG. 14 illustrates the operations of the plan proposal device 20.

A process of Step S231 is the same as the process of Step S211 and thus description thereof will be omitted.

In Step S232, the controller 21 of the plan proposal device 20 refers to the map data D7 and determines whether the position of the vehicle 12 determined in Step S231 is included in a reference geographical range G2. The geographical range G2 may be the parking lot 51 or any range including the parking lot 51 and the vicinity of the parking lot 51. In the example of FIG. 3, the geographical range G2 is the ground in the town 50. When the position of the vehicle 12 is included in the geographical range G2, a process of Step S233 is executed. When the position of the vehicle 12 is not included in the geographical range G2, the process of Step S231 is repeated.

In Step S233, the controller 21 of the plan proposal device 20 analyzes the parking tendency of the user U1. The parking tendency may be analyzed by any method. In the present embodiment, the parking tendency is analyzed by inputting, into a trained model, data indicating a parking position, information about whether the user U1 followed a parking instruction, the number of occupants, information about whether charging equipment was used, or a parking method indicating whether the vehicle faced forward or backward when the user U1 parked the vehicle 12 in the parking lot 51 in the past, and acquiring an analysis result from the trained model.

In Step S234, the controller 21 of the plan proposal device 20 selects one parking space from among the parking spaces in the parking lot 51 based on the parking tendency of the user U1. In the example of FIG. 3, the parking space 56 is selected because the AI determines that the parking space 56 provides the highest satisfaction for the user U1 among the available parking spaces 55 in the parking lot 51 based on the parking tendency of the user U1.

In Step S235, the controller 21 of the plan proposal device 20 generates guidance data D11. The guidance data D11 is data for providing guidance on a route from the position of the vehicle 12 determined in Step S231 to the parking space selected in Step S234. For example, when the parking space 56 is selected in Step S234, guidance is provided on the route 64 illustrated in FIG. 3. The controller 21 outputs the generated guidance data D11 to the communicator 23. The communicator 23 transmits the guidance data D11 to the terminal device 30.

The communicator 33 of the terminal device 30 receives the guidance data D11 transmitted in Step S235 from the plan proposal device 20. The controller 31 of the terminal device 30 acquires the guidance data D11 received by the communicator 33. The controller 31 presents the acquired guidance data D11 to the user U1. Any method may be used as a method for presenting the guidance data D11 to the user U1. The present embodiment uses a method of displaying contents of the guidance data D11 on the display serving as the outputter 35, a method of outputting the contents of the guidance data D11 by voice and sound from the loudspeaker serving as the outputter 35, or both of these methods.

As described above, in the present embodiment, the controller 21 of the plan proposal device 20 predicts, as the user action, the action of the user U1 in the period P, including parking the vehicle 12 in the parking lot 51 shared by the users 11. The controller 21 generates the proposal data D1 for proposing the action plan in the period P based on the obtained prediction result and the information on the parking lot 51 in the period P. The controller 21 outputs the generated proposal data D1.

According to the present embodiment, the action plan related to the use of the parking lot 51 can be proposed to the user U1. For example, it is possible to propose an alternative plan when the use of the parking lot 51 is predicted in a time frame in which the congestion of the parking lot 51 exceeds the reference. As a result, satisfaction of the user U1 is improved.

The present disclosure is not limited to the embodiment described above. For example, two or more blocks in the block diagram may be integrated, or a single block may be divided apart. Two or more steps in the flowchart may be executed in parallel or in different order as necessary or based on processing capacities of devices that execute the steps, instead of being executed in time series in accordance with description. Other modifications may be made without departing from the gist of the present disclosure.

For example, the plan proposal device 20 may be provided in the vehicle 12. In that case, a part of the operations of the terminal device 30 may be performed by the plan proposal device 20. The terminal device 30 may be integrated with the plan proposal device 20. The plan proposal device 20 may output the proposal data D1 or the guidance data D9, D10, or D11 to the user U1 instead of outputting the proposal data D1 or the guidance data D9, D10, or D11 to the network 40. That is, the plan proposal device 20 may directly present the proposal data D1 or the guidance data D9, D10, or D11 to the user U1 instead of transmitting the proposal data D1 or the guidance data D9, D10, or D11 to the terminal device 30 and presenting the data to the user U1.

What is claimed is:

1. A plan proposal device comprising a controller configured to:

predict, as a user action, an action of a first user in a certain period, including parking a vehicle in a parking lot shared by a plurality of users including the first user and a second user;

generate proposal data for proposing an action plan in the certain period based on an obtained prediction result and information on the parking lot in the certain period; and output the generated proposal data, wherein:

the prediction result includes a first estimated time when the first user is expected to leave the parking lot with the vehicle;

the information on the parking lot includes an estimated congestion status of an exit of the parking lot or a road around the parking lot at the first estimated time; and the controller is configured to include, in the action plan, an action of leaving the parking lot with the vehicle at a leaving time different from the first estimated time under a condition that the estimated congestion status exceeds a reference congestion level.

2. The plan proposal device according to claim 1, wherein the controller is configured to acquire attribute data indicating an attribute of the first user, and predict the user action based on the acquired attribute data.

3. The plan proposal device according to claim 2, wherein the controller is configured to acquire the attribute data by presenting a questionnaire for determining the attribute to the first user and analyzing an answer to the presented questionnaire.

4. The plan proposal device according to claim 2, wherein the controller is configured to predict the user action by inputting the attribute data into a prediction model for predicting an action and acquiring the prediction result from the prediction model.

5. The plan proposal device according to claim 4, wherein the controller is configured to generate or update the prediction model by performing machine learning while associating data indicating action records of the users with data indicating attributes of the users.

6. The plan proposal device according to claim 1, wherein the controller is configured to analyze an action tendency of the first user based on record data indicating an action record of the first user, and predict the user action based on an obtained analysis result.

7. The plan proposal device according to claim 1, wherein the controller is configured to predict the user action based on schedule data indicating a schedule of the first user.

8. The plan proposal device according to claim 1, wherein:
the prediction result includes a second estimated time when the first user is expected to enter the parking lot with the vehicle;
the information on the parking lot includes an estimated congestion status of the parking lot or an entrance of the parking lot at the second estimated time; and
the controller is configured to include, in the action plan, an action of entering with the vehicle into the parking lot at an entering time different from the second estimated time under a condition that the estimated congestion status exceeds a reference congestion level.

9. The plan proposal device according to claim 8, wherein the controller is configured to predict an action of the second user in the certain period, including parking in the parking lot, and calculate the estimated congestion status based on the predicted action of the second user.

10. The plan proposal device according to claim 1, wherein the controller is configured to predict an action of the second user in the certain period, including parking in the parking lot, and calculate the estimated congestion status based on the predicted action of the second user.

11. The plan proposal device according to claim 1, wherein:
the prediction result includes an estimated point that the first user is expected to visit by the vehicle before entering the parking lot by the vehicle;
the information on the parking lot includes positional relationships between the estimated point and a plurality of entrances of the parking lot; and
the controller is configured to select one entrance from among the entrances based on the positional relationships, and include, in the action plan, an action of entering with the vehicle from the selected entrance.

12. The plan proposal device according to claim 1, wherein:
the prediction result includes an estimated point that the first user is expected to visit with the vehicle after leaving the parking lot with the vehicle;
the information on the parking lot includes positional relationships between the estimated point and a plurality of exits of the parking lot; and
the controller is configured to select one exit from among the exits based on the positional relationships, and include, in the action plan, an action of leaving the selected exit with the vehicle.

13. The plan proposal device according to claim 1, wherein:
the prediction result includes a predicted action to be taken by the first user after parking the vehicle in the parking lot;
the information on the parking lot includes information on a plurality of parking spaces in the parking lot; and
the controller is configured to select one parking space from among the parking spaces based on the predicted action, and include, in the action plan, an action of parking of the vehicle in the selected parking space.

14. The plan proposal device according to claim 1, wherein the controller is configured to:
select one entrance from among a plurality of entrances of the parking lot based on congestion statuses of the entrances when a position of the vehicle is included in a reference geographical range;
generate guidance data for providing guidance on a route from the position of the vehicle to the selected entrance; and
output the generated guidance data.

15. The plan proposal device according to claim 1, wherein the controller is configured to:
select one parking area from among a plurality of parking areas of the parking lot based on congestion statuses of the parking areas when a position of the vehicle is included in a reference geographical range;
generate guidance data for providing guidance on a route from the position of the vehicle to the selected parking area; and
output the generated guidance data.

16. The plan proposal device according to claim 1, wherein the controller is configured to:
select one parking space from among a plurality of parking spaces in the parking lot based on a parking tendency of the first user when a position of the vehicle is included in a reference geographical range;
generate guidance data for providing guidance on a route from the position of the vehicle to the selected parking space; and
output the generated guidance data.

17. A system comprising:
the plan proposal device according to claim 1; and
a terminal device including at least one of a display and a speaker, wherein
the terminal device is configured to:
receive the proposal data from the plan proposal device; and
display contents of the proposal data on the display or output the contents of the proposal data by voice and sound from the speaker.

18. A vehicle comprising the plan proposal device according to claim 1.

19. A plan proposal method comprising:
predicting, by a controller, as a user action, an action of a first user in a certain period, including parking a vehicle in a parking lot shared by a plurality of users including the first user;
generating, by the controller, proposal data for proposing an action plan in the certain period based on an obtained prediction result and information on the parking lot in the certain period; and
outputting the generated proposal data from the controller, wherein:
the prediction result includes a first estimated time when the first user is expected to leave the parking lot with the vehicle;
the information on the parking lot includes an estimated congestion status of an exit of the parking lot or a road around the parking lot at the first estimated time; and
the plan proposal method further comprising, including, in the action plan, an action of leaving the parking lot with the vehicle at a leaving time different from the first estimated time under a condition that the estimated congestion status exceeds a reference congestion level.

\* \* \* \* \*